United States Patent
Inomata

(10) Patent No.: US 9,532,003 B2
(45) Date of Patent: Dec. 27, 2016

(54) INFORMATION PROCESSING APPARATUS, INFORMATION PROCESSING SYSTEM, AND NON-TRANSITORY COMPUTER READABLE MEDIUM

(71) Applicant: FUJI XEROX CO., LTD., Tokyo (JP)

(72) Inventor: Kohshiro Inomata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/743,615

(22) Filed: Jun. 18, 2015

(65) Prior Publication Data

US 2016/0134839 A1    May 12, 2016

(30) Foreign Application Priority Data

Nov. 6, 2014    (JP) .................................. 2014-226075

(51) Int. Cl.
H04N 7/14    (2006.01)
H04N 7/15    (2006.01)

(52) U.S. Cl.
CPC .................................... H04N 7/152 (2013.01)

(58) Field of Classification Search
CPC ........................................................ H04N 7/14
USPC ..................... 348/14.01, 14.03, 14.12, 14.08
See application file for complete search history.

(56) References Cited

U.S. PATENT DOCUMENTS

| | | | | |
|---|---|---|---|---|
| 9,049,338 B2* | 6/2015 | Witt | .................. | G06F 17/30017 |
| 2007/0214421 A1* | 9/2007 | Jolley | ............... | G06F 17/30581 |
| | | | | 715/742 |
| 2007/0214423 A1* | 9/2007 | Teplov | .................. | G06F 3/1454 |
| | | | | 715/751 |
| 2013/0145284 A1* | 6/2013 | Anantharaman | ... | H04L 12/1822 |
| | | | | 715/753 |
| 2016/0092442 A1* | 3/2016 | Gillett | ............... | G06F 17/30011 |
| | | | | 707/608 |

FOREIGN PATENT DOCUMENTS

| | | |
|---|---|---|
| JP | 8-307417 A | 11/1996 |
| JP | 2002-009765 A | 1/2002 |

* cited by examiner

*Primary Examiner* — Olisa Anwah
(74) *Attorney, Agent, or Firm* — Sughrue Mion, PLLC

(57) ABSTRACT

A non-transitory computer readable medium stores a program causing a computer to execute a process for synchronous display of a document for use at a conference on multiple terminals connected via a network and for transmission and reception of media data including at least one of audio data and video data. The process includes, in accordance with whether or not each of multiple users has a right to access a document selected by a first user on a first terminal, controlling content for display on multiple terminals used by the multiple users, and controlling transmission and reception of the media data between the first terminal and each of the multiple terminals.

12 Claims, 27 Drawing Sheets

FIG. 7

| TERMINAL NAME | TERMINAL ID |
|---|---|
| 10a | ID001 |
| 10f | ID006 |

FIG. 8

| TERMINAL NAME | TERMINAL ID |
|---|---|
| 10a | ID001 |
| 10b | ID002 |
| 10c | ID003 |
| 10d | ID004 |
| 10e | ID005 |
| 10f | ID006 |

FIG. 9

| TERMINAL NAME | TERMINAL ID |
|---|---|
| 10a | ID001 |
| 10b | ID002 |
| 10c | ID003 |
| 10d | ID004 |
| 10e | ID005 |
| 10f | ID006 |
| 10g | ID007 |

FIG. 16

| DOCUMENT NAME | USER: TERMINAL ID | | | | | |
|---|---|---|---|---|---|---|
| X | A: ID001 | B: ID002 | C: ID003 | D: ID004 | E: ID005 | F: ID006 |
| Y | A: ID001 | B: ID002 | D: ID004 | E: ID005 | F: ID006 | |
| Z | A: ID001 | B: ID002 | C: ID003 | D: ID004 | E: ID005 | |
| ... | ... | ... | ... | ... | ... | ... |

FIG. 19

| TERMINAL NAME | TERMINAL ID |
|---|---|
| 10a | ID001 |
| 10b | ID002 |
| 10d | ID004 |
| 10e | ID005 |
| 10f | ID006 |

FIG. 27

| TERMINAL NAME | TERMINAL ID |
|---|---|
| 10a | ID001 |
| 10d | ID004 |
| 10e | ID005 |
| 10f | ID006 |

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-226075 filed Nov. 6, 2014.

BACKGROUND (i) Technical Field

The present invention relates to an information processing apparatus, an information processing system, and a non-transitory computer readable medium.

(ii) Related Art

Teleconferencing systems have recently been used in conferences. In the teleconferencing systems, personal computers (PCs), tablet terminals, and similar devices are interconnected via a network to share electronic data of documents for use at the conferences such as materials.

SUMMARY

According to an aspect of the invention, there is provided a non-transitory computer readable medium storing a program causing a computer to execute a process for synchronous display of a document for use at a conference on multiple terminals connected via a network and for transmission and reception of media data including at least one of audio data and video data. The process includes, in accordance with whether or not each of multiple users has a right to access a document selected by a first user on a first terminal, controlling content for display on multiple terminals used by the multiple users, and controlling transmission and reception of the media data between the first terminal and each of the multiple terminals.

BRIEF DESCRIPTION OF THE DRAWINGS

Exemplary embodiments of the present invention will be described in detail based on the following figures, wherein:

FIG. 7 illustrates an example of a transmission terminal list;

FIG. 8 illustrates an example of a reception terminal list;

FIG. 9 illustrates an example of an updated reception terminal list;

FIG. 16 is a table illustrating an example of access restriction information;

FIG. 19 illustrates an example of an updated reception terminal list;

FIG. 27 illustrates an example of a reception terminal list;

DETAILED DESCRIPTION

An exemplary embodiment of the present invention will be described hereinafter with reference to the drawings. An information processing system according to this exemplary embodiment will be described in the context of a teleconferencing system as an example. In the teleconferencing system, multiple terminals connected to one another via a network share (or synchronize) electronic data of documents for a conference such as materials and media data such as audio data and image data.

Figure 1:
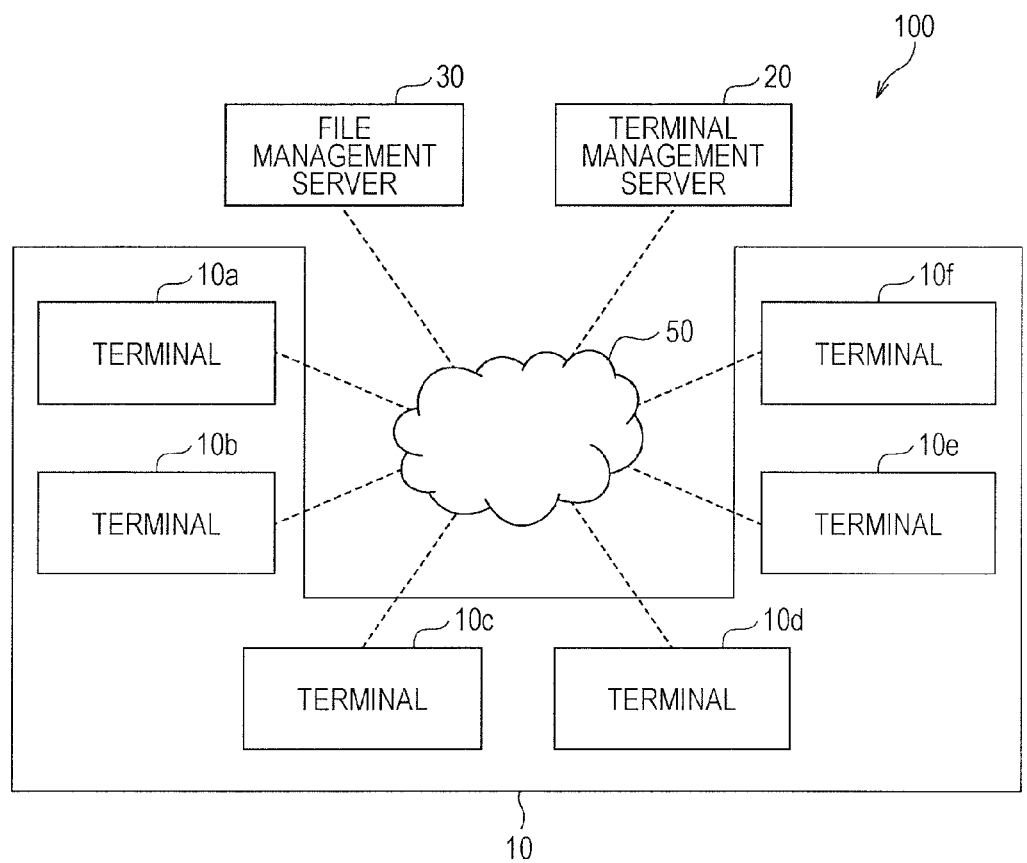
FIG. 1 is an overall configuration diagram of a teleconferencing system according to an exemplary embodiment.

FIG. 1 is an overall configuration diagram of a teleconferencing system according to this exemplary embodiment. A teleconferencing system 100 (or an information processing system) includes multiple terminals 10 each of which is used (or operated) by one of multiple users who attend a conference, a terminal management server 20 that manages the terminals 10, and a file management server 30 that manages files of documents for use at the conference such as materials. The terminal management server 20 and the file management server 30 may be included in a single information processing apparatus. In this exemplary embodiment, a user who gives a presentation at the conference is referred to as a "presenter", and a terminal used by a presenter is referred to as a "presenter terminal", as appropriate. Further, a user who attends or participates in the conference, other than a presenter, is referred to as a "participant", and a terminal used by a participant is referred to as a "participant terminal". In FIG. 1, for example, if a terminal 10a is a presenter terminal, the other five terminals 10b, 10c, 10d, 10e, and 10f will be participant terminals. Each of the terminals 10 may be either a presenter terminal or a participant terminal. Further, a presenter terminal is given an operating authorization which allows a display screen corresponding to the content of the operation performed by a presenter on their presenter terminal to be synchronously displayed on participant terminals other than the presenter terminal. The presenter may have the right to speak (or an audio transmission right) about documents such as materials at the conference. A single user may have the right to speak, or multiple users may have the right to speak. In the following, the general term "terminal 10" is used to describe functions which are common to a presenter terminal and a participant terminal.

Each of the terminals 10 has both a transmission function of transmitting audio data of speech made by a user, and a reception function of receiving the audio data. Accordingly, for example, a presenter may be able to perform an operation on a document displayed on their own terminal 10 to enable the document to be synchronously displayed on the terminals 10 of the participants, and may also be able to read aloud the explanation about the document to enable the spoken words to be output from the terminals 10 of the participants.

As illustrated in FIG. 1, the terminals 10a, 10b, 10c, 10d, 10e, and 10f, the terminal management server 20, and the file management server 30 are interconnected via a communication network 50 such as a local area network (LAN) or the Internet.

Figure 2:
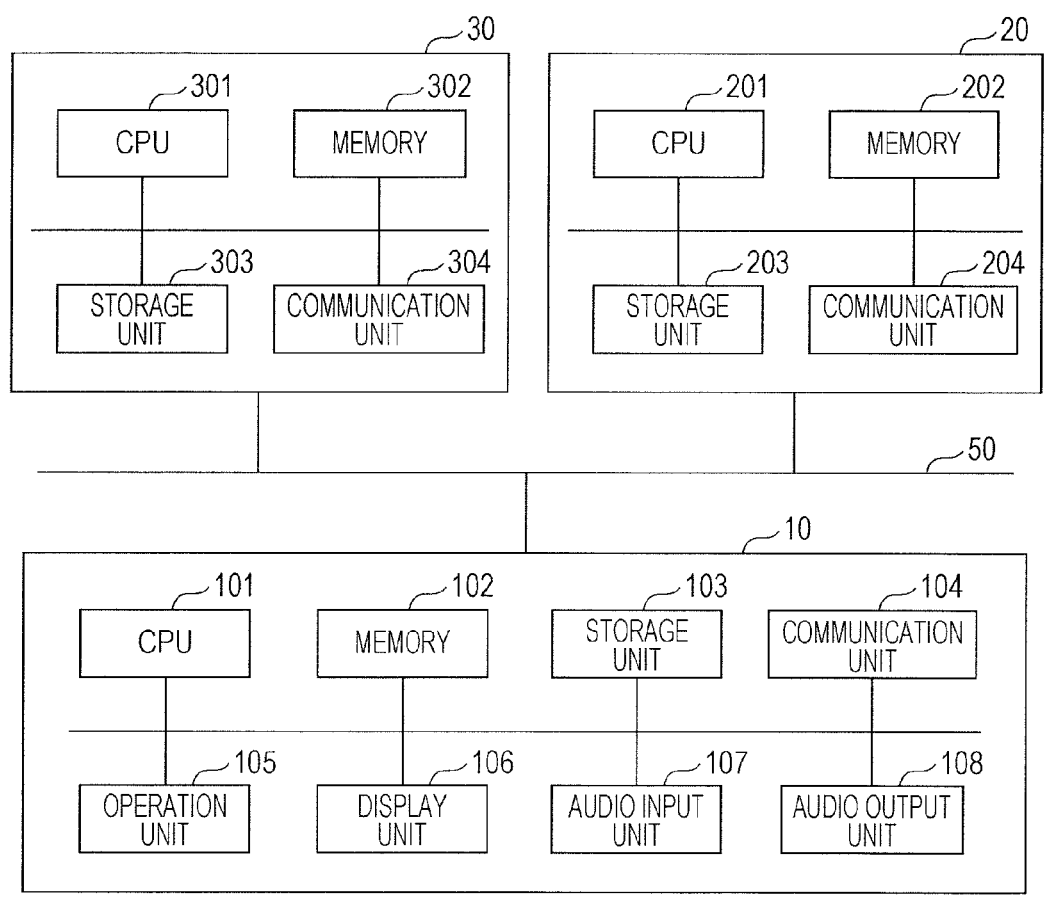
FIG. 2 is a block diagram illustrating a hardware configuration of the teleconferencing system.

FIG. 2 is a block diagram illustrating a hardware configuration of the terminal 10, the terminal management server 20, and the file management server 30.

The terminal 10 is formed by a computer including a central processing unit (CPU) 101, a memory 102, a storage unit 103, a communication unit 104, an operation unit 105, a display unit 106, an audio input unit 107, and an audio output unit 108. The hardware components described above are interconnected via a bus so as to enable transmission and reception of data among them. The CPU 101 controls each unit of the terminal 10, and executes various kinds of information processing. The memory 102 holds various programs and data. The memory 102 also has a working area for the CPU 101. The storage unit 103 stores data of various files, documents, and the like. The communication unit 104 performs data communication with the terminal management server 20, the file management server 30, and the other terminals 10 via the communication network 50. The operation unit 105 is an input device such as a keyboard, a mouse, a pen tool, or a touch panel. The display unit 106 is a display screen on which various files, documents, and the like are displayed by using application software such as a web browser. The display unit 106 also displays an operation screen for accepting an operation performed by a user at the conference, and a document for use at the conference such as materials. The audio input unit 107 is a microphone to which the audio of a user who speaks at the conference is input. The audio output unit 108 is a speaker from which audio data received from another terminal 10 at the conference is output as audio. The storage unit 103, the operation unit 105, the display unit 106, the audio input unit 107, and the audio output unit 108 may be located outside the terminal 10, and may be connected to the terminal 10 via the communication network 50.

The terminal 10 is a terminal used by a user who attends the conference. The terminal 10 has incorporated therein software such as a browser or an electronic mail client. The terminal 10 may be a mobile information terminal such as a personal computer, a personal digital assistant (PDA), or a smartphone. A single terminal 10 may be, for example, a single browser, a single window in a browser, or a single application.

The terminal management server 20 is formed by a computer including a CPU 201, a memory 202, a storage unit 203, and a communication unit 204. The hardware components described above are interconnected via a bus so as to enable transmission and reception of data among them. The CPU 201 controls each unit of the terminal management server 20, and executes various kinds of information processing. The memory 202 holds various programs and data. The memory 202 also has a working area for the CPU 201. The storage unit 203 stores data of various files, documents, and the like. The communication unit 204 performs data communication with the terminals 10 and the file management server 30 via the communication network 50. The storage unit 203 may be located outside the terminal management server 20, and may be connected to the terminal management server 20 via the communication network 50.

The file management server 30 is formed by a computer including a CPU 301, a memory 302, a storage unit 303, and a communication unit 304. The hardware components described above are interconnected via a bus so as to enable transmission and reception of data among them. The CPU 301 controls each unit of the file management server 30, and executes various kinds of information processing. The memory 302 holds various programs and data. The memory 302 also has a working area for the CPU 301. The storage unit 303 stores data of various files, documents, and the like. The communication unit 304 performs data communication with the terminals 10 and the terminal management server 20 via the communication network 50. The storage unit 303 may be located outside the file management server 30, and may be connected to the file management server 30 via the communication network 50.

Figure 3:
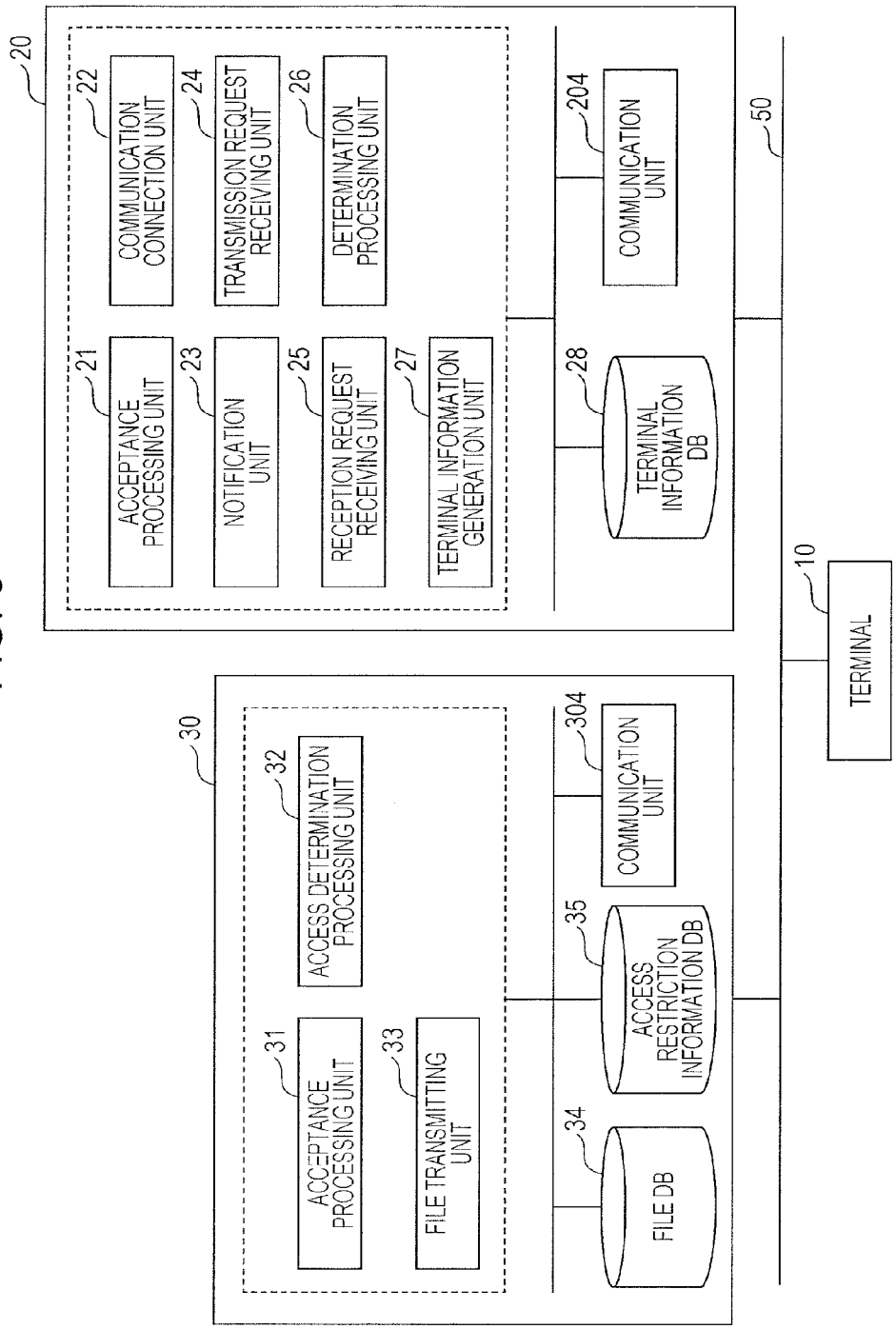
FIG. 3 is a functional block diagram illustrating a specific configuration of a terminal management server and a file management server.

FIG. 3 is a functional block diagram illustrating a specific configuration of the teleconferencing system 100. FIG. 3 illustrates a specific configuration of the terminal management server 20 and the file management server 30.

The terminal management server 20 includes an acceptance processing unit 21, a communication connection unit 22, a notification unit 23, a transmission request receiving unit 24, a reception request receiving unit 25, a determination processing unit 26, and a terminal information generation unit 27. The components described above are implemented by the CPU 201 executing a program stored in the memory 202. The storage unit 203 includes a terminal information database (e.g., a terminal information DB 28) that stores terminal information.

The program described above may be installed to the terminal management server 20 from a computer-readable information storage medium such as a compact disc read-only memory (CD-ROM), a digital versatile disc ROM (DVD-ROM), or a memory card, or may be downloaded via the communication network 50 such as the Internet. Alternatively, the program described above may be downloaded from a server in which the program is stored in advance.

The program described above may be installed into each of the terminals 10. For example, at the time when the terminal 10 is connected to the terminal management server 20, the program described above may be downloaded to the memory 102 of each of the terminals 10 from the terminal management server 20, and document data for the conference may be downloaded to the storage unit 103. The program and document data described above may be in, for example, JavaScript (registered trademark) form. Each of the terminals 10 serves as an information processing apparatus when the program described above is downloaded or recorded to the terminal 10. Further, a computer from which the program described above is downloaded may be the terminal 10 or the terminal management server 20.

In the teleconferencing system 100 according to this exemplary embodiment, the terminal management server 20 has a program for implementing the functions illustrated in FIG. 3. When each of the terminals 10 is connected to the terminal management server 20 and is authenticated, for example, data of documents for use at the conference, a display control program for controlling content for display (including synchronous display) on the display unit 106 of the terminal 10, and a communication path control program for controlling establishment, disconnection, and the like of a communication path through which audio data is transmitted and received are downloaded to the terminal 10.

Synchronous Display Process

Next, functions for implementing a synchronous display process performed in the teleconferencing system 100 will be described.

The acceptance processing unit 21 accepts (or receives) various kinds of information (such as operation information and request information) corresponding to the content of the operation performed by a user on each of the terminals 10, and executes a process in accordance with the accepted information. Examples of the operation information include information on operations performed by a presenter during the conference (such as the display of a new document and switching from page to page in documents). Examples of the request information include information on a request for connecting each of the terminals 10 to the terminal management server 20, and a request for disconnecting the connection between each of the terminals 10 and the terminal management server 20.

The communication connection unit 22 provides connection and disconnection of communication with each of the terminals 10 in accordance with a connection request and a disconnection request received from the terminal 10. The communication standard used in the teleconferencing system 100 may be, for example, but not limited to, Web Socket. The method for authenticating a connection with each of the terminals 10 is not limited to any specific method, and any known technique may be used.

The notification unit 23 notifies each participant terminal of operation information on a presenter (presenter operation information) when the conference starts and during the conference. The presenter operation information is information indicating the content of operations such as displaying a new document, writing on a document with a pen tool (a handwriting tool), picking up (or selecting) a posted comment, switching from page to page in documents, and displaying and moving the mouse pointer. For example, upon receipt of presenter operation information (e.g., information on a document ID identifying a document in which a presenter has switched from one page to another and a page number) from a presenter terminal, the notification unit 23 notifies each participant terminal of the presenter operation information. Upon receipt of the presenter operation information, each participant terminal reads document data corresponding to the document ID and the page number from the storage unit 103 thereof, and displays the read document data on the display screen.

A description will now be given of a specific example of a synchronous display operation performed at a conference. It is assumed here that the terminal 10a is designated as a presenter terminal (or is given an operating authorization) and the terminals 10b, 10c, 10d, 10e, and 10f are designated as participant terminals. When the acceptance processing unit 21 receives presenter operation information from the presenter terminal 10a, the notification unit 23 notifies the participant terminals 10b, 10c, 10d, 10e, and 10f of the presenter operation information. For example, the acceptance processing unit 21 receives information indicating the content of operations, such as displaying a new document, writing on a document with a pen tool (a handwriting tool), picking up (or selecting) a posted comment, switching from page to page in documents, and displaying and moving the mouse pointer, from the presenter terminal 10a.

Figure 4:
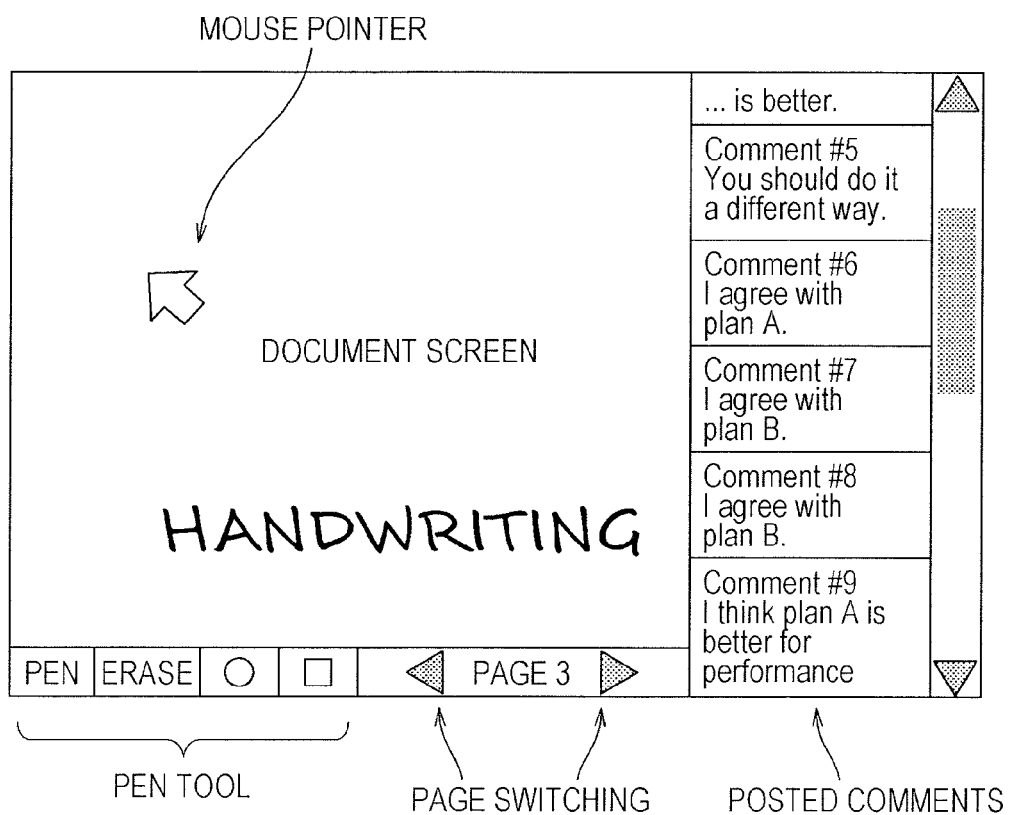
FIG. 4 illustrates an example of content displayed on a display screen of a presenter terminal.

FIG. 4 illustrates an example of content displayed on a display screen of the presenter terminal 10a. For example, the presenter operates the operation unit 105, such as the mouse, of the presenter terminal 10a, and reads a document saved in the storage unit 103 of the presenter terminal 10a (i.e., displays a new document on a document screen). In this case, the acceptance processing unit 21 receives from the presenter terminal 10a presenter operation information including information indicating a document ID and a page number. Further, for example, the presenter operates the mouse of the presenter terminal 10a, and causes the mouse pointer to be displayed on a document screen (see FIG. 4) displayed on the display unit 106. In this case, the acceptance processing unit 21 receives from the presenter terminal 10a presenter operation information including information indicating the position (coordinates) of the mouse pointer, the ID of the document and the page number on which the mouse pointer is displayed, and so forth. Further, for example, the presenter operates the pen tool on the presenter terminal 10a, and writes characters or the like on the document screen (see FIG. 4) displayed on the display unit 106. In this case, the acceptance processing unit 21 receives from the presenter terminal 10a presenter operation information including information indicating the position (coordinates) at which the characters or the like are written, the ID of the document and the page number on which the characters or the like are written, and so forth. Further, for example, the presenter operates the mouse of the presenter terminal 10a, and switches from page to page on the document screen (see FIG. 4) displayed on the display unit 106. In this case, the acceptance processing unit 21 receives from the presenter terminal 10a presenter operation information including information indicating the ID of the displayed document and the designated page number.

When the acceptance processing unit 21 receives the presenter operation information described above, the notification unit 23 notifies the participant terminals 10b, 10c, 10d, 10e, and 10f of the presenter operation information. Upon receipt of the presenter operation information, each of the participant terminals 10b, 10c, 10d, 10e, and 10f displays a display screen corresponding to the presenter operation information on the display unit 106. For example, each of the participant terminals 10b, 10c, 10d, 10e, and 10f reads document data corresponding to the document ID and the page number from the storage unit 103 thereof, and displays the read document data on the display unit 106. In the way described above, the content displayed on the display screen of the terminal 10 used by a presenter who performs an operation on the documents to be shared at the conference is synchronously displayed on the display screens of the multiple terminals 10 used by multiple participants who attend the conference. Any known technique may be used for synchronous display or asynchronous display in the teleconferencing system 100. Each participant terminal executes a display control program to display content for display which corresponds to the presenter operation information on the display unit 106 thereof. Each of the terminals 10 has functions as a display controller.

Communication Path Establishment Process

Next, functions for implementing a communication path establishment process performed in the teleconferencing system 100 will be described.

Figure 5:
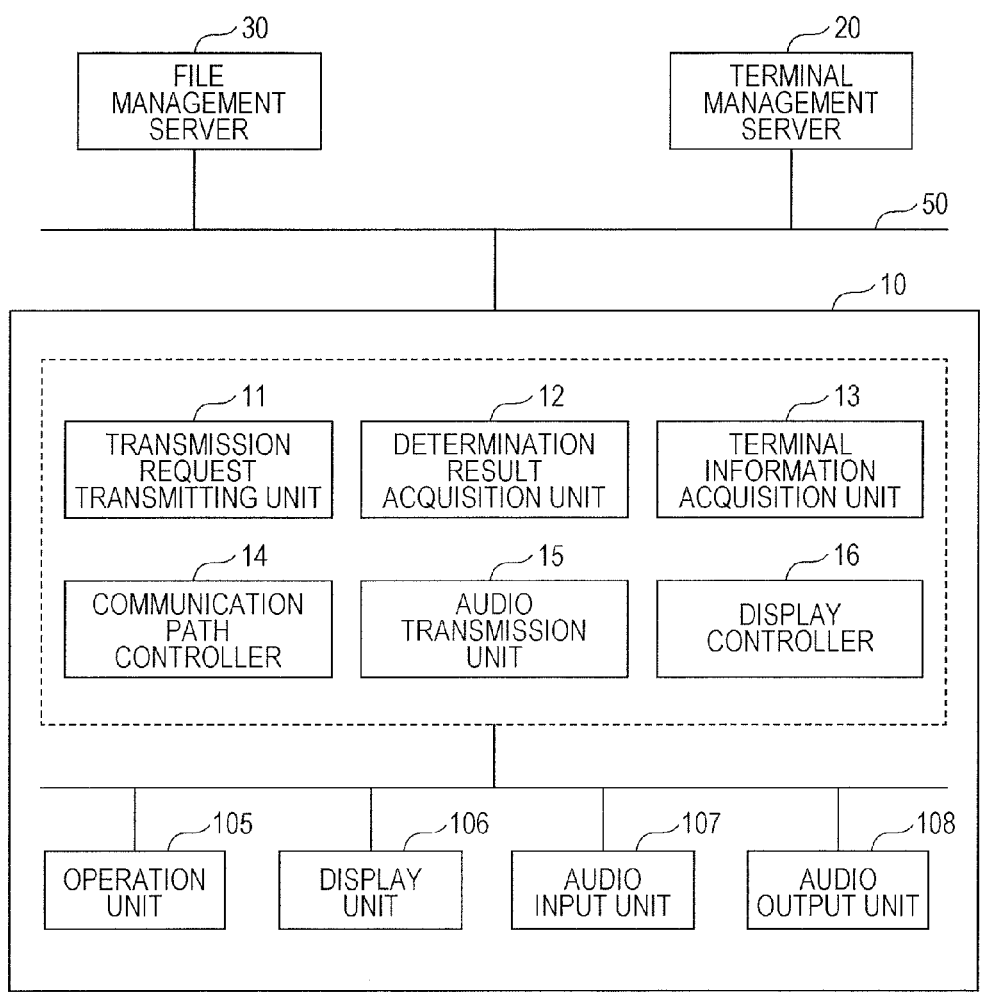
FIG. 5 is a functional block diagram illustrating a specific configuration of a terminal.
Figure 6:
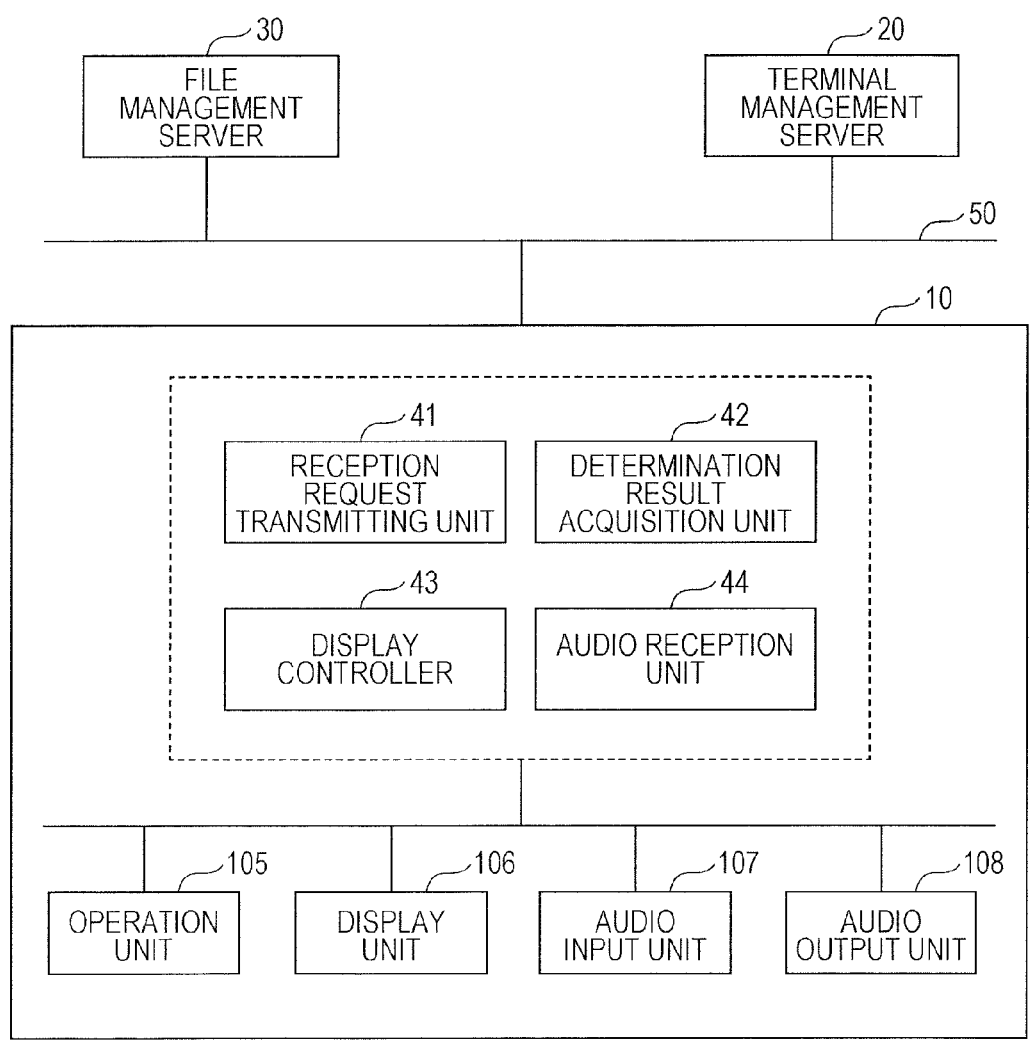
FIG. 6 is a functional block diagram illustrating a specific configuration of the terminal.

FIG. 5 and FIG. 6 are functional block diagrams illustrating a specific configuration of the terminal 10 in the teleconferencing system 100. In the following, for convenience of illustration, the terminal 10 illustrated in FIG. 5 (hereinafter also referred to as the "transmission terminal") represents functional blocks corresponding to a transmission function, and the terminal 10 illustrated in FIG. 6 (hereinafter also referred to as the "reception terminal") represents functional blocks corresponding to a reception function. As described above, each of the terminals 10 has both the transmission function (see FIG. 5) and the reception function (see FIG. 6). Either the transmission terminal 10 or the reception terminal 10 may have the operating authorization described above, or none of them may have the operating authorization described above.

As illustrated in FIG. 5, the transmission terminal 10 includes a transmission request transmitting unit 11, a determination result acquisition unit 12, a terminal information acquisition unit 13, a communication path controller 14, an audio transmission unit 15, and a display controller 16. As illustrated in FIG. 6, the reception terminal 10 includes a reception request transmitting unit 41, a determination result acquisition unit 42, a display controller 43, and an audio reception unit 44.

Each of the components included in each of the terminals 10 described above is implemented by the CPU 101 (see FIG. 2) of the terminal 10 executing a program stored in the memory 102 (see FIG. 2) of the terminal 10. The program described above may be installed from a computer-readable information storage medium such as a CD-ROM, a DVD-ROM, or a memory card to each of the terminals 10, or may be downloaded via the communication network 50 such as the Internet. Alternatively, a program corresponding to a given element may be downloaded to each of the terminals 10 from the terminal management server 20 on which the programs corresponding to the individual components described above are stored in advance.

The functions corresponding to the programs described above will now be described. In the following, a description will be given with reference to the process flow of the teleconferencing system 100 according to the progress of a conference.

First, at the conference, a user operates the operation unit 105 of the terminal 10 to give instructions to transmit their speech (or audio) to another terminal 10, that is, to request the establishment of a communication path between their terminal and another terminal to transmit audio data. For example, a user A selects a selection screen (for example, a checkbox or an electronic button) for "audio transmission" displayed on the display unit 106 of the terminal 10 (see FIG. 5) used by the user A at the conference, by using the keyboard, the mouse, and the like. The transmission request transmitting unit 11 of the terminal 10 transmits the accepted request made by the user A (hereinafter referred to as the "transmission request") to the terminal management server 20. For example, when the user A removes the checkmark from the checkbox for "audio transmission" or when a predetermined condition is satisfied (described below), the transmission request transmitting unit 11 transmits a transmission cancellation request. For example, the transmission request transmitting unit 11 transmits "+1" to transmit a transmission request, and transmits "−1" to transmit a cancellation request.

Further, at the conference, a user operates the operation unit 105 of the terminal 10 to give instructions to receive speech (or audio) of another user. For example, a user B selects a selection screen (for example, a checkbox or an electronic button) for "audio reception" displayed on the display unit 106 of the terminal 10 (see FIG. 6) used by the user B at the conference, by using the keyboard, the mouse, and the like. The reception request transmitting unit 41 of the terminal 10 transmits the accepted request made by the user B (hereinafter referred to as the "reception request") to the terminal management server 20. For example, when the user B removes the checkmark from the checkbox for "audio reception" or when a predetermined condition is satisfied (described below), the reception request transmitting unit 41 transmits a reception cancellation request. For example, the reception request transmitting unit 41 transmits "+1" to transmit a reception request, and transmits "−1" to transmit a cancellation request.

Each of the terminals 10 shows the selection screens for both "audio transmission" and "audio reception", and each user is able to separately select the selection screens. For example, the user A may be able to select both "audio transmission" and "audio reception" on the terminal 10.

The transmission request receiving unit 24 of the terminal management server 20 (see FIG. 3) receives a transmission request transmitted from the transmission request transmitting unit 11 of the terminal 10. For example, in a case where a transmission request is transmitted from each of the terminals 10a and 10f, the transmission request receiving unit 24 receives the transmission requests from both the terminals 10a and 10f.

The reception request receiving unit 25 of the terminal management server 20 receives a reception request transmitted from the reception request transmitting unit 41 of the terminal 10. For example, in a case where a reception request is transmitted from each of the terminals 10a to 10f, the reception request receiving unit 25 receives the reception requests from the terminals 10a to 10f.

The determination processing unit 26 of the terminal management server 20 determines, in accordance with a transmission request received by the transmission request receiving unit 24, whether or not transmission of audio from the terminal 10 that has transmitted the transmission request is permitted. Specifically, the determination processing unit 26 compares the total number of terminals 10 that have made a transmission request received by the transmission request receiving unit 24 with a predetermined set value, and determines whether or not the total number is less than or equal to the set value. If the total number is less than or equal to the set value, the determination processing unit 26 permits transmission of audio from the terminal 10 that has made a transmission request. If the total number exceeds the set value, the determination processing unit 26 rejects audio transmission. For example, the set value is set to "3". In this case, if each of the terminals 10a and 10f has made a transmission request, the total number of terminals that have made a transmission request (i.e., two) is less than or equal to the set value (i.e., "3"). Thus, transmission of audio from the terminals 10a and 10f is permitted.

The determination processing unit 26 calculates the total number of terminals 10 that have made a transmission request at the current point in time (or at the time when the target terminal makes a transmission request). For example, the terminals 10a and 10f have already made a transmission request, and the terminal 10b additionally makes a new transmission request. In this case, the total number of terminals that have made a transmission request at the current point in time is three. Accordingly, for example, in a case where the set value is set to "2", if the terminals 10a and 10f have already made a transmission request (in which case audio transmission may have already been performed) and the terminal 10b additionally makes a new transmission request, the total number (i.e., three) exceeds the set value (i.e., "2"). Thus, the determination processing unit 26 rejects transmission of audio from the terminal 10b that has made the new transmission request.

In the manner described above, transmission of audio from a number of terminals 10 is permitted in the order in which the terminals 10 made a transmission request until the number of terminals 10 has reached a set value. In a case where the number of terminals 10 from which transmission of audio has been permitted reaches the set value, transmission of audio from an additional terminal 10 will not be permitted unless transmission of audio (or the communication path) from any of the terminals 10 is canceled.

The determination processing unit 26 transmits the determination result (a permission notification or a rejection notification) to the terminal 10 that has transmitted a transmission request.

The determination processing unit 26 may also determine, in accordance with a reception request received by the reception request receiving unit 25, whether or not reception of audio by the terminal 10 that has transmitted the reception request is permitted. For example, the determination processing unit 26 compares the total number of terminals 10 that have made a reception request received by the reception request receiving unit 25 with a predetermined set value, and determines whether or not the total number is less than or equal to the set value. The determination processing unit 26 may also determine the permission or rejection of audio reception in accordance with any other condition described below (a first modification described below). Alternatively, the determination processing unit 26 may permit audio reception for all the reception requests received by the reception request receiving unit 25. The determination processing unit 26 transmits the determination result (a permission notification or a rejection notification) to the terminal 10 that has transmitted a reception request.

Further, if the total number of terminals 10 allowed to make a transmission request has reached a set value, the determination processing unit 26 may transmit a notification (or a message) indicating that the number of transmission terminals has reached a specified value (or set value) and that no further transmission requests are allowed to all the terminals 10 connected to the terminal management server 20. Similarly, if the number of terminals 10 allowed to make a transmission request falls below the set value because of the reception of a transmission cancellation request, the determination processing unit 26 may transmit a notification indicating that a transmission request is now allowed to all the terminals 10. The determination processing unit 26 may also transmit a notification indicating the remaining number of terminals 10 up to the set value. For example, the set value is set to 2. In this case, when a transmission request is made from the terminal 10a, the determination processing unit 26 may notify the terminal 10a of a transmission permission, and transmit the remaining number ("1") of terminals 10 up to the set value to all the terminals 10. Then, when a transmission request is made from the terminal 10f, the determination processing unit 26 may notify the terminal 10f of a transmission permission, and transmit the value "0" to all the terminals 10. Then, when a transmission cancellation request is made from the terminal 10a, the determination processing unit 26 may transmit the value "1" to all the terminals 10. The determination processing unit 26 may also execute a process similar to that described above for a reception request.

The terminal information generation unit 27 of the terminal management server 20 generates transmission terminal information in accordance with a transmission request received by the transmission request receiving unit 24 and the determination result described above which is obtained by the determination processing unit 26. Specifically, if the total number is less than or equal to the set value, the terminal information generation unit 27 lists pieces of terminal information on the terminals 10 from which transmission of audio is permitted to generate a transmission terminal list. For example, if transmission requests received from the terminals 10a and 10f are permitted, the terminal information generation unit 27 lists pieces of terminal information including, for example, the names and identification information (such as the terminal IDs and the IP addresses) of the terminals 10a and 10f to generate a transmission terminal list. FIG. 7 illustrates an example of the transmission terminal list. The terminal information generation unit 27 updates the transmission terminal list each time a received transmission request is permitted or each time a transmission request is canceled. The generated transmission terminal list is saved to the terminal information DB 28.

Further, the terminal information generation unit 27 generates reception terminal information in accordance with a reception request received by the reception request receiving unit 25. Specifically, the terminal information generation unit 27 lists pieces of terminal information on the terminals 10 for which a reception request is permitted to generate a reception terminal list. For example, if reception requests received from the terminals 10a to 10f are permitted, the terminal information generation unit 27 lists pieces of terminal information including, for example, the names and identification information (such as the terminal IDs and the IP addresses) of the terminals 10a to 10f to generate a reception terminal list. FIG. 8 illustrates an example of the reception terminal list. The terminal information generation unit 27 updates the reception terminal list each time a received reception request is permitted or each time a reception request is canceled. FIG. 9 illustrates an updated reception terminal list obtained when a new reception request received from a network-connected terminal 10g (not illustrated) is permitted in the state illustrated in FIG. 8. The generated reception terminal list is saved to the terminal information DB 28.

Further, the terminal information generation unit 27 transmits the reception terminal list to the terminals 10 from which transmission of audio has been permitted by the determination processing unit 26. Also when the reception terminal list is updated (or modified), the terminal information generation unit 27 transmits the updated reception terminal list to the terminals 10 from which transmission of audio has been permitted. For example, if transmission of audio from the terminals 10a and 10f is permitted, the terminal information generation unit 27 transmits the reception terminal list (see FIG. 8) to the terminals 10a and 10f. Also when the reception terminal list is updated, the terminal information generation unit 27 transmits the updated reception terminal list to the terminals 10*a* and 10*f*. In this case, the terminal information generation unit 27 may transmit only the modified (or added) portion of the reception terminal list.

The determination result acquisition unit 12 (see FIG. 5) of the terminal 10 receives (or acquires) the determination result obtained by the determination processing unit 26 of the terminal management server 20. For example, the determination result acquisition units 12 of the terminals 10*a* and 10*f* acquire a permission notification for audio transmission from the terminal management server 20.

The terminal information acquisition unit 13 (or a terminal information receiving unit) (see FIG. 5) of the terminal 10 acquires (or receives) a reception terminal list from the terminal information generation unit 27 of the terminal management server 20. For example, the terminal information acquisition units 13 of the terminals 10*a* and 10*f* acquire the reception terminal list illustrated in FIG. 8 from the terminal management server 20.

Figure 10:
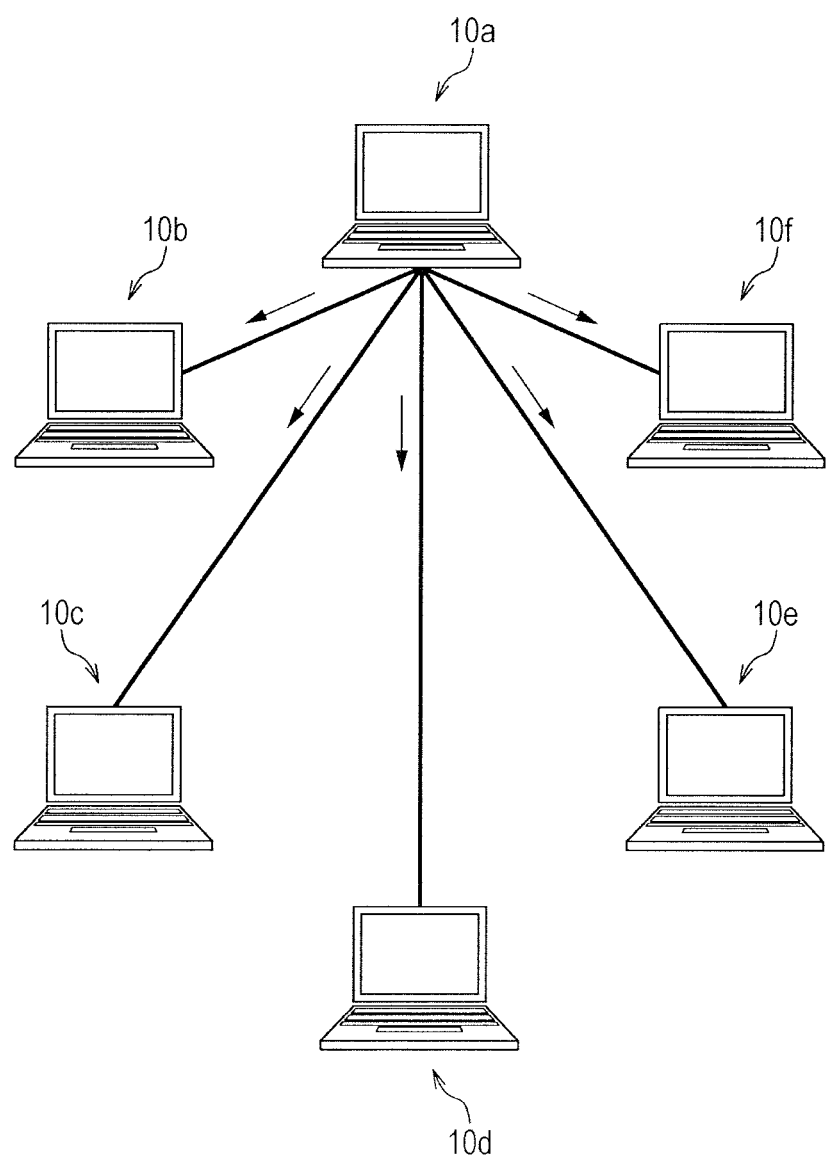
FIG. 10 illustrates an example of a network configuration indicating communication paths.
Figure 11:
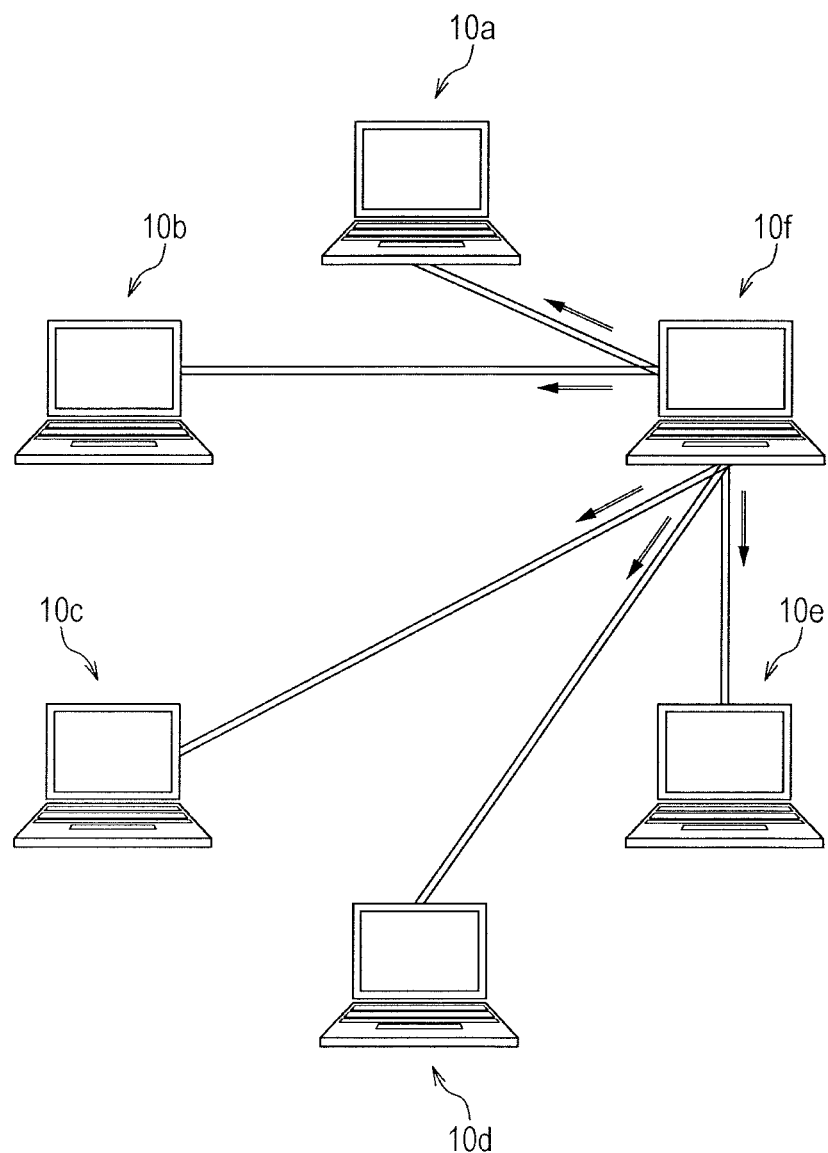
FIG. 11 illustrates an example of a network configuration indicating communication paths.
Figure 12:
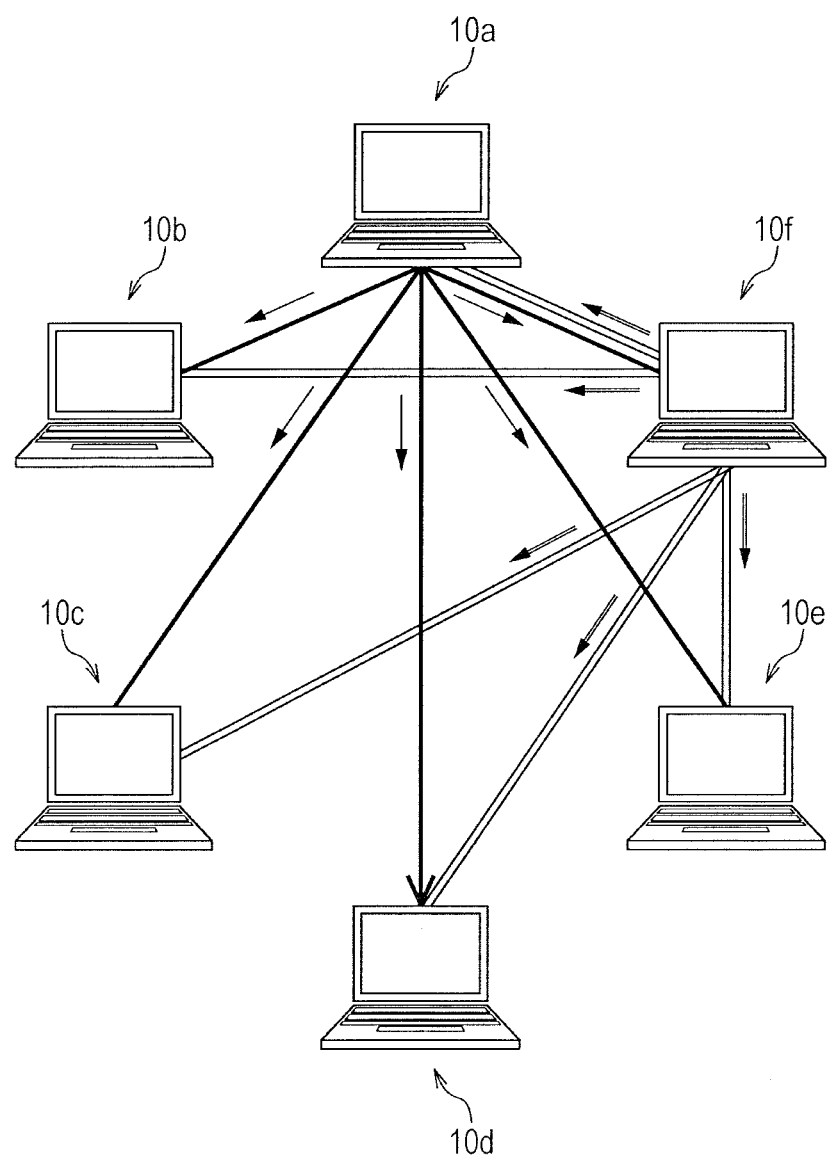
FIG. 12 illustrates an example of a network configuration indicating communication paths.

The communication path controller 14 (controller) (see FIG. 5) of the terminal 10 establishes a communication path with another terminal 10, to transmit (or allow transmission and reception of) audio data, in accordance with the reception terminal list acquired by the terminal information acquisition unit 13. The acquired reception terminal list is saved to the storage unit 103. For example, the communication path controller 14 of the terminal 10*a* establishes a communication path between the terminal 10*a* and each of the terminals 10*b*, 10*c*, 10*d*, 10*e*, and 10*f*. FIG. 10 illustrates a network configuration indicating a communication path established between the terminal 10*a* and each of the terminals 10*b*, 10*c*, 10*d*, 10*e*, and 10*f*. Similarly, the communication path controller 14 of the terminal 10*f* establishes a communication path between the terminal 10*f* and each of the terminals 10*a*, 10*b*, 10*c*, 10*d*, and 10*e*. FIG. 11 illustrates a network configuration indicating a communication path established between the terminal 10*f* and each of the terminals 10*a*, 10*b*, 10*c*, 10*d*, and 10*e*. FIG. 12 illustrates a network configuration indicating all the communication paths established in the illustrated example described above. In FIG. 10 to FIG. 12, the orientation of each arrow represents the direction in which audio data is transmitted. While FIG. 10 to FIG. 12 illustrate a configuration in which audio data is transmitted and received without intervention of the terminal management server 20, the network configuration is not limited to the illustrated configuration. Another configuration may be used in which audio data is transmitted and received using the terminal management server 20 as a relay.

Further, a communication path is established by, for example, a terminal (or a transmission terminal) that performs audio transmission between the transmission terminal and a terminal (or a reception terminal) that receives the audio in accordance with reception terminal information, namely, the IP address and the port number. For example, when the user A removes the checkmark from the checkbox for "audio transmission" displayed on the display unit 106 of the terminal 10*a*, the communication path controller 14 cancels the established communication path.

The audio transmission unit 15 (see FIG. 5) of the terminal 10 transmits (or distributes) audio data input to the audio input unit 107 to the terminals 10 via the communication paths described above when the communication paths are established by the communication path controller 14. For example, the audio transmission unit 15 transmits audio data corresponding to the speech (or audio) of the user A, which is input to the audio input unit 107 of the terminal 10*a*, to the terminals 10*b*, 10*c*, 10*d*, 10*e*, and 10*f* via communication paths (indicated by single lines in FIG. 12). Further, the audio transmission unit 15 transmits audio data corresponding to the speech (or audio) of a user F, which is input to the audio input unit 107 of the terminal 10*f*, to the terminals 10*a*, 10*b*, 10*c*, 10*d*, and 10*e* via communication paths (indicated by double lines in FIG. 12). Accordingly, the speech (audio data) of the user A and the speech (audio data) of the user F may be transmitted to the other terminals 10 at the same timing, for example. The audio transmission unit 15 may transmit an audio stream (or transmit audio by streaming) to each of the terminals 10, or may transmit an audio data file to each of the terminals 10. If each of a transmission terminal and a reception terminal has a web browser incorporated therein, an audio stream in the transmission terminal may be connected to the reception terminal by using Web Real-Time Communication (WebRTC).

The display controller 16 (see FIG. 5) of the terminal 10 causes content for display which corresponds to the determination result acquired by the determination result acquisition unit 12 to be displayed on the display unit 106. For example, if the determination result acquisition unit 12 acquires a permission notification for audio transmission from the terminal management server 20, the display controller 16 causes a message indicating permission of audio transmission to be displayed on the display unit 106. If the determination result acquisition unit 12 acquires a rejection notification for audio transmission from the terminal management server 20, the display controller 16 causes an error message indicating rejection of audio transmission to be displayed on the display unit 106, and further modifies the selection screen (e.g., the checkbox or the electronic button) for "audio transmission" displayed on the display unit 106 so that the selection screen for "audio transmission" will not be selected. For example, an electronic button for selecting audio transmission (or transmission request) may be grayed out (or made inactive) so that the electronic button will not be selected (or pressed), or a comment indicating that "no transmission request is currently available" may be displayed on the display unit 106. Accordingly, the display controller 16 may control content for display on the display unit 106 so that the user will not be able to perform further audio transmission (or transmission request).

The determination result acquisition unit 42 (see FIG. 6) of the terminal 10 receives (or acquires) the determination result obtained by the determination processing unit 26 of the terminal management server 20. For example, the determination result acquisition units 42 of the terminals 10*a* to 10*f* acquire a permission notification for audio reception from the terminal management server 20.

When the determination result acquisition unit 42 acquires the permission notification described above, the display controller 43 (see FIG. 6) of the terminal 10 causes a message indicating permission of audio reception to be displayed on the display unit 106. If the determination result acquisition unit 42 acquires a rejection notification for audio reception from the terminal management server 20, the display controller 43 causes an error message indicating rejection of audio reception to be displayed on the display unit 106, and further modifies the selection screen (e.g., the checkbox or the electronic button) for "audio reception" displayed on the display unit 106 so that the selection screen for "audio reception" will not be selected.

The audio reception unit 44 (see FIG. 6) of the terminal 10 receives audio data transmitted via the communication paths described above. The audio output unit 108 converts the received audio data and outputs audio. For example, the audio reception units 44 of the terminals 10b, 10c, 10d, 10e, and 10f receive audio data corresponding to the speech (or audio) of the user A transmitted from the terminal 10a via the communication paths (indicated by the single lines in FIG. 12), and the audio output units 108 of the terminals 10b, 10c, 10d, 10e, and 10f output audio. Further, the audio reception units 44 of the terminals 10a, 10b, 10c, 10d, and 10e receive audio data corresponding to the speech (or audio) of the user F transmitted from the terminal 10f via the communication paths (indicated by the double lines in FIG. 12), and the audio output units 108 of the terminals 10a, 10b, 10c, 10d, and 10e output audio. Accordingly, for example, the users B, C, D, and E of the terminals 10b, 10c, 10d, and 10e may be able to listen to the speech of the user A and the speech of the user F at the same timing.

Figure 13:
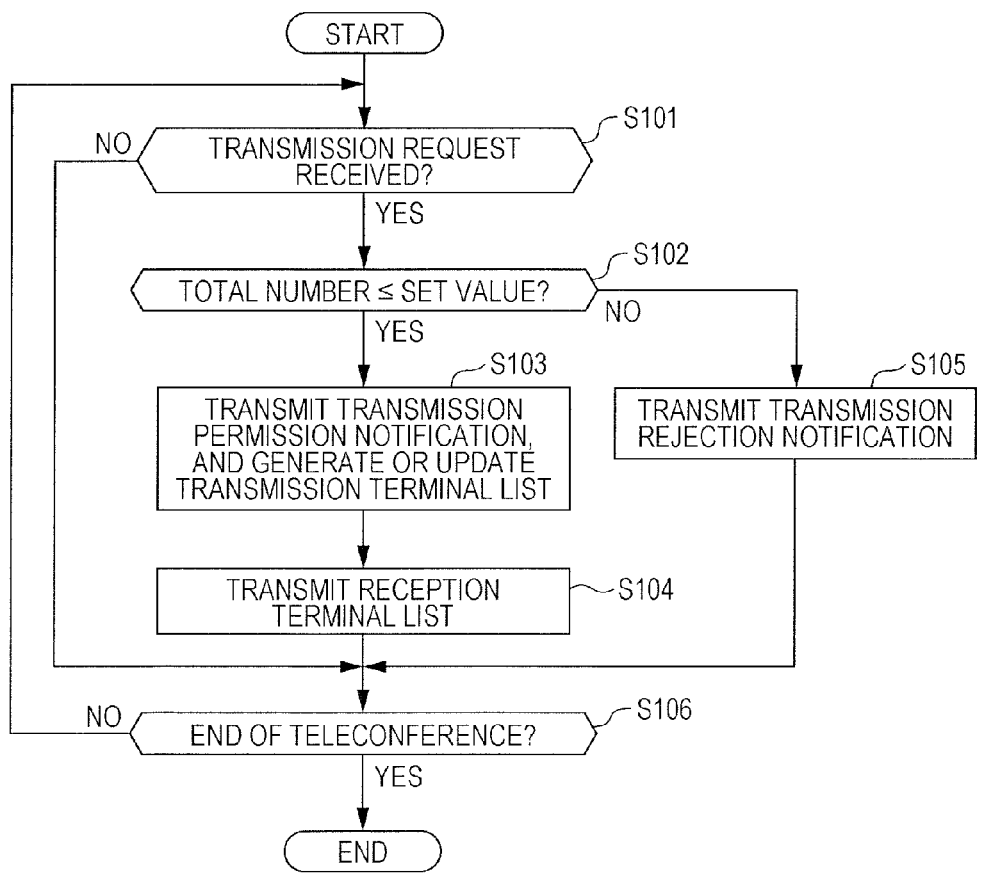
FIG. 13 is an operation flow diagram of the teleconferencing system.

Next, the flow of the communication path establishment process performed in the teleconferencing system 100 will be described with reference to a flow diagram. FIG. 13 is a flow diagram of the operation performed when the terminal management server 20 receives a transmission request from the terminal 10. This process is executed in response to, for example, when starting a conference, the terminal management server 20 notifying multiple terminals 10 connected to the terminal management server 20 via a network of the start of the conference. Processes illustrated in FIG. 14 and FIG. 15, described below, are also performed in a similar manner.

First, when a transmission request is transmitted from the terminal 10, the transmission request receiving unit 24 receives the transmission request (S101). Then, the determination processing unit 26 compares the total number of terminals 10 that have made a transmission request with a predetermined set value, and determines whether or not the total number is less than or equal to the set value (S102).

If the total number is less than or equal to the set value, the determination processing unit 26 transmits a permission notification for audio transmission to the terminal 10 that has made the transmission request, and the terminal information generation unit 27 generates or updates a transmission terminal list (see FIG. 7) (S103). Then, the terminal information generation unit 27 lists pieces of information on terminals that have made a reception request to generate a reception terminal list, and transmits the reception terminal list to the terminals 10 registered in the transmission terminal list (S104).

If it is determined in S102 that the total number exceeds the set value, the determination processing unit 26 transmits a rejection notification for audio transmission to the terminal 10 that has transmitted the transmission request (S105). The processing of S101 to S105 is repeatedly performed until the end of the conference (S106).

Figure 14:
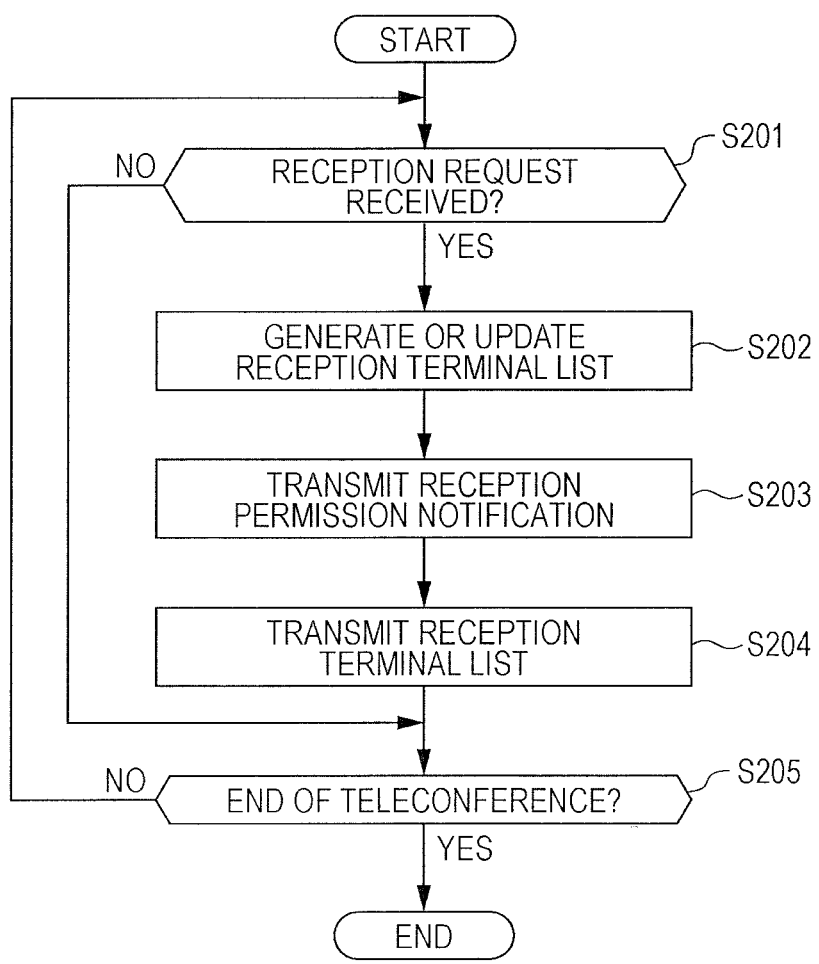
FIG. 14 is an operation flow diagram of the teleconferencing system.

FIG. 14 is a flow diagram of the operation performed when the terminal management server 20 receives a reception request from the terminal 10.

First, when a reception request is transmitted from the terminal 10, the reception request receiving unit 25 receives the reception request (S201). Then, the terminal information generation unit 27 generates or updates a reception terminal list (see FIG. 8) (S202). Then, the terminal information generation unit 27 transmits a permission notification for audio reception to the terminals 10 registered in the reception terminal list (S203). By way of example, audio reception is permitted for all the reception requests received by the reception request receiving unit 25. Alternatively, the determination processing unit 26 may permit audio reception only when the total number is less than or equal to a predetermined set value, and, if audio reception is rejected, may transmit a rejection notification for audio reception to the terminal 10. Then, the terminal information generation unit 27 acquires the transmission terminal list, and transmits the reception terminal list to each of the terminals 10 registered in the transmission terminal list (S204). If the reception terminal list is modified (or updated), only the modified (or added) portions of the reception terminal list may be transmitted. The processing of S201 to S204 is repeatedly performed until the end of the conference (S205).

Figure 15:
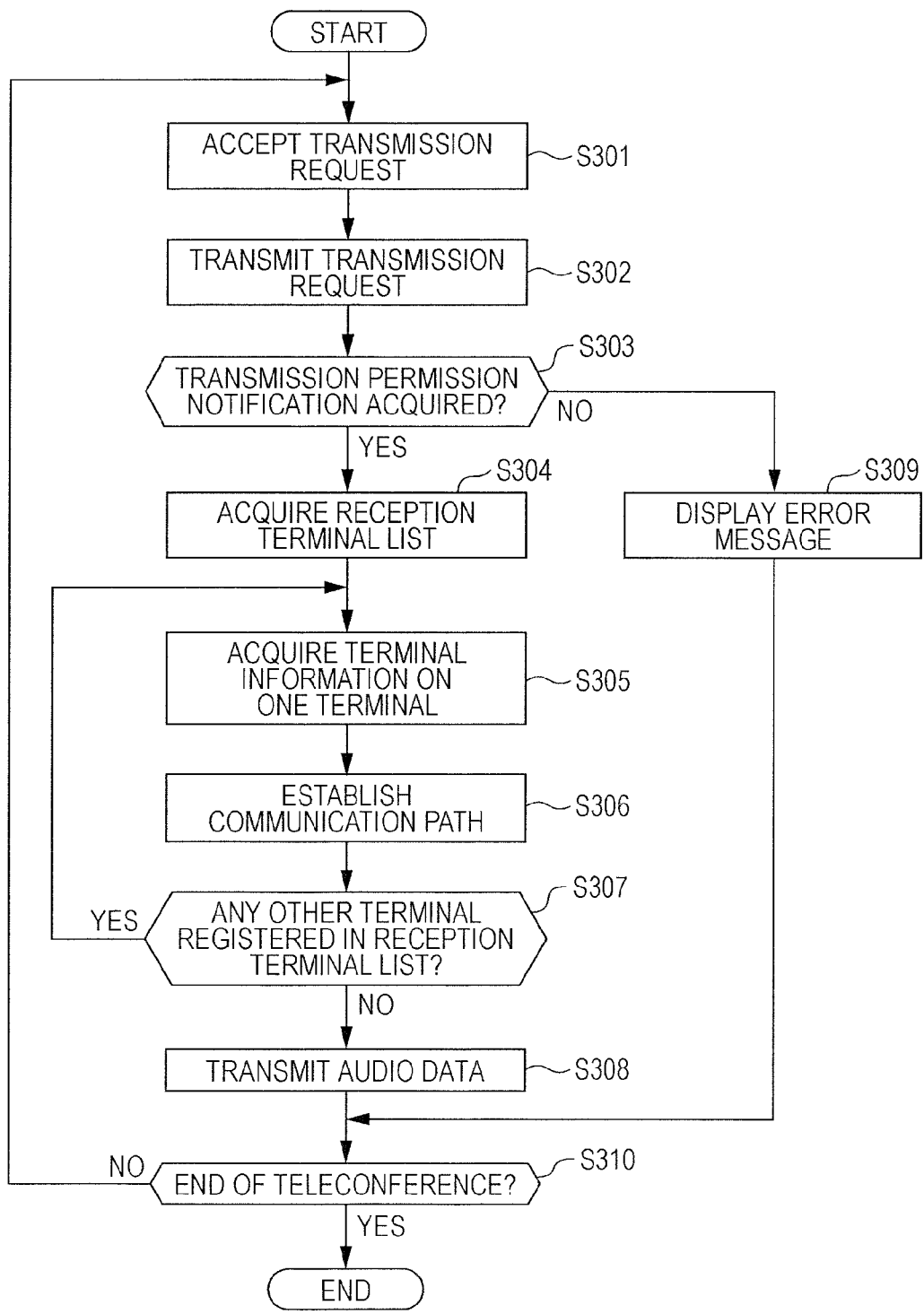
FIG. 15 is an operation flow diagram of the teleconferencing system.

FIG. 15 is a flow diagram of a process (a communication path establishment process) performed by the terminal 10 performed when a user makes a transmission request by using the terminal 10.

First, the terminal 10 accepts a transmission request from a user at the conference (S301). Then, the transmission request transmitting unit 11 transmits the accepted transmission request to the terminal management server 20 (S302). Upon receipt of the transmission request, the terminal management server 20 executes the processing of S101 to S105 illustrated in FIG. 13.

Then, the determination result acquisition unit 12 of the terminal 10 acquires a transmission permission notification or a transmission rejection notification from the terminal management server 20 (S303). If a transmission permission notification is acquired, the terminal information acquisition unit 13 acquires the reception terminal list from the terminal management server 20 (S304).

Then, the communication path controller 14 acquires terminal information (e.g., the terminal ID) on any one of the terminals 10 from the reception terminal list (S305). Then, the communication path controller 14 establishes a communication path to transmit audio data to the terminal 10 corresponding to the acquired terminal information (S306). The communication path controller 14 executes a process for establishing communication paths with all the terminals 10 registered in the reception terminal list (S307).

Then, the audio transmission unit 15 transmits audio data to the terminals 10 via the established communication paths (S308).

If it is determined in S303 that the determination result acquisition unit 12 acquires a transmission rejection notification from the terminal management server 20, the display controller 16 of the terminal 10 causes an error message to be displayed on the display unit 106 (S309). The processing of S301 to S309 is repeatedly performed until the end of the conference (S310).

As described above, the teleconferencing system 100 according to this exemplary embodiment imposes an upper limit on the number of transmission terminals that are given the right to speak (or transmit audio), and dynamically changes the establishment of a communication path for a terminal permitted to perform transmission in accordance with instructions given by a user so that a communication path is established between the terminal permitted to perform transmission and another terminal. In addition, each user may be able to perform selection in accordance with their intention, such as wishing to transmit speech (or audio) or wishing to receive audio, and the establishment of a communication path between terminals on the network may be achieved so as to be dynamically changed in accordance with the user's intention.

In addition, the teleconferencing system 100 provides control of audio data communication independently of how documents (or content for display) are shared (e.g., synchronously or asynchronously). That is, separate synchronous control of documents and audio may be achieved among multiple terminals. Accordingly, for example, if a network for communication paths for transmitting and receiving audio data is created in the manner illustrated in FIG. 12 during the conference and the user A of the terminal 10a is a presenter who performs an operation regarding the content for display, the user A may be able to make a speech (for example, give an explanation about the content for display) while performing the operation described above. This enables the users B, C, D, E, and F of the other terminals 10b, 10c, 10d, 10e, and 10f to listen to the speech (e.g., explanation) of the user A output from the audio output units 108 of the respective terminals while checking the display screen corresponding to the content of the operation performed on the terminal 10a on the display screens of the respective terminals.

In the configuration described above, for example, the user A, who is a presenter, allows a document X displayed on the display unit 106 of the terminal 10a to be synchronously displayed on the display units 106 of the terminals 10b to 10f of the users B to F, who are participants, and also allows speech made by the user A to be output from the terminals 10b to 10f. In the configuration described above, furthermore, when the user A performs an operation on the document X, such as writing on the document X with the pen tool, picking up a posted comment, switching from page to page of the document X, or displaying and moving the mouse pointer on the document X, the content corresponding to the operation is displayed synchronously on the display units 106 of the terminals 10b to 10f.

The teleconferencing system 100 according to this exemplary embodiment has, in addition to a function of implementing the configuration described above, a function of controlling audio communication (or a communication path) for each terminal on the basis of the right of each user to access documents. For example, in the configuration described above, the user A changes the document X to another document Y (e.g., the user A displays a new document). In this case, the right of each of the users B to F to access the document Y is identified, and synchronous display is canceled or audio communication is disconnected for a terminal of a user who does not have the right to access the document Y.

In the following, a description will be given of an access control process performed in the teleconferencing system 100, which corresponds to the function described above.

Access Control Process

The teleconferencing system 100 according to this exemplary embodiment further includes the file management server 30 as a configuration for implementing the access control process. The file management server 30 has a function of managing documents (or files) for use at the conference, and limiting the access of a user (or a terminal) to the documents. The teleconferencing system 100 controls synchronous and asynchronous display of documents and audio communication in accordance with the access restriction status of the documents in the file management server 30.

As illustrated in FIG. 3, the file management server 30 includes an acceptance processing unit 31, an access determination processing unit 32, and a file transmitting unit 33. The components described above are implemented by the CPU 301 executing a program stored in the memory 302 (see FIG. 2). The storage unit 303 includes a file database (e.g., a file DB 34) that stores various documents (or files) for use at the conference, and an access restriction information database (e.g., an access restriction information DB 35) in which access restriction information on access of users to the documents is associated with the documents.

The program described above may be installed to the file management server 30 from a computer-readable information storage medium such as a CD-ROM, a DVD-ROM, or a memory card, or may be downloaded via the communication network 50 such as the Internet. Alternatively, the program described above may be downloaded from a server in which the program is stored in advance.

The program described above may be installed into each of the terminals 10. For example, at the time when the terminal 10 is connected to the file management server 30, the program described above may be downloaded to the memory 102 of each of the terminals 10 from the file management server 30, and document data for the conference may be downloaded to the storage unit 103. The program and document data described above may be in, for example, JavaScript (registered trademark) form. Each of the terminals 10 serves as an information processing apparatus when the program described above is downloaded or recorded to the terminal 10. Further, a computer from which the program described above is downloaded may be the terminal 10 or the file management server 30. In the teleconferencing system 100 according to this exemplary embodiment, the file management server 30 has a program for implementing the functions illustrated in FIG. 3.

The acceptance processing unit 31 accepts (or receives) an acquisition request for acquiring a document stored in the file DB 34 from each of the terminals 10, and further executes a process in accordance with the acquisition request. For example, in a case where the user A, who is a presenter, selects the document Y on the terminal 10a, the acceptance processing unit 31 receives an acquisition request for acquiring the document Y from the terminal 10a. Further, in a case where the user B, who is a participant, selects the document Y on the terminal 10b, the acceptance processing unit 31 receives an acquisition request for acquiring the document Y from the terminal 10b. Each of the acquisition requests may be associated with identification information (such as the IDs and passwords) on the corresponding user.

The access determination processing unit 32 (a determination unit) refers to the access restriction information DB 35 in accordance with the acquisition request acquired by the acceptance processing unit 31, and determines the authorization to access (or the presence or absence of the right to access) the document corresponding to the acquisition request. In the access restriction information DB 35, multiple documents are registered in association with users authorized to access the document and identification information (e.g., the terminal IDs) on terminals used by the users on a document-by-document basis. FIG. 16 is a table illustrating an example of the access restriction information DB 35. In the example illustrated in FIG. 16, the users A, B, C, D, E, and F have a right to access the document X, and the users A, B, D, E, and F have a right to access the document Y. Further, the users A, B, C, D, and E have a right to access a document Z. The access determination processing unit 32 transmits a determination result to the terminal management server 20. Whether or not each user has a right to access the individual documents is registered in advance by an administrator or the like, and is updated, if necessary. The identification information on each terminal may not necessarily be registered in advance in the access restriction information DB 35. The identification information on each terminal may be acquired, for example, when the acquisition request described above is received, by identifying the terminal that has transmitted the acquisition request.

The acceptance processing unit 31 (or the acceptance processing unit 21 of the terminal management server 20) may have a function (a user identification unit) of identifying users who use the terminals 10 connected to the communication network 50, and the access determination processing unit 32 may determine whether or not each of the identified users has a right to access the document corresponding to the acquisition request.

The file transmitting unit 33 transmits the document to the acquisition request to the terminal 10 of each of the users who have a right to access the document.

The terminal management server 20 executes the following process. The acceptance processing unit 21 receives from the terminal 10 used by a presenter a notification (or a change notification) indicating a change of the document for use at the conference, and transmits information (such as access information regarding a new document) corresponding to the received change notification to each of the terminals 10 used by the participants. Further, the acceptance processing unit 21 receives the determination result described above from the file management server 30. The terminal information generation unit 27 updates the reception terminal list in accordance with the determination result, and transmits the updated reception terminal list to a terminal 10 from which transmission of audio has been permitted.

Upon receipt of the updated reception terminal list, the terminal 10 that performs audio transmission executes a process for re-establishing a communication path (described below) in accordance with the reception terminal list.

Figure 17:
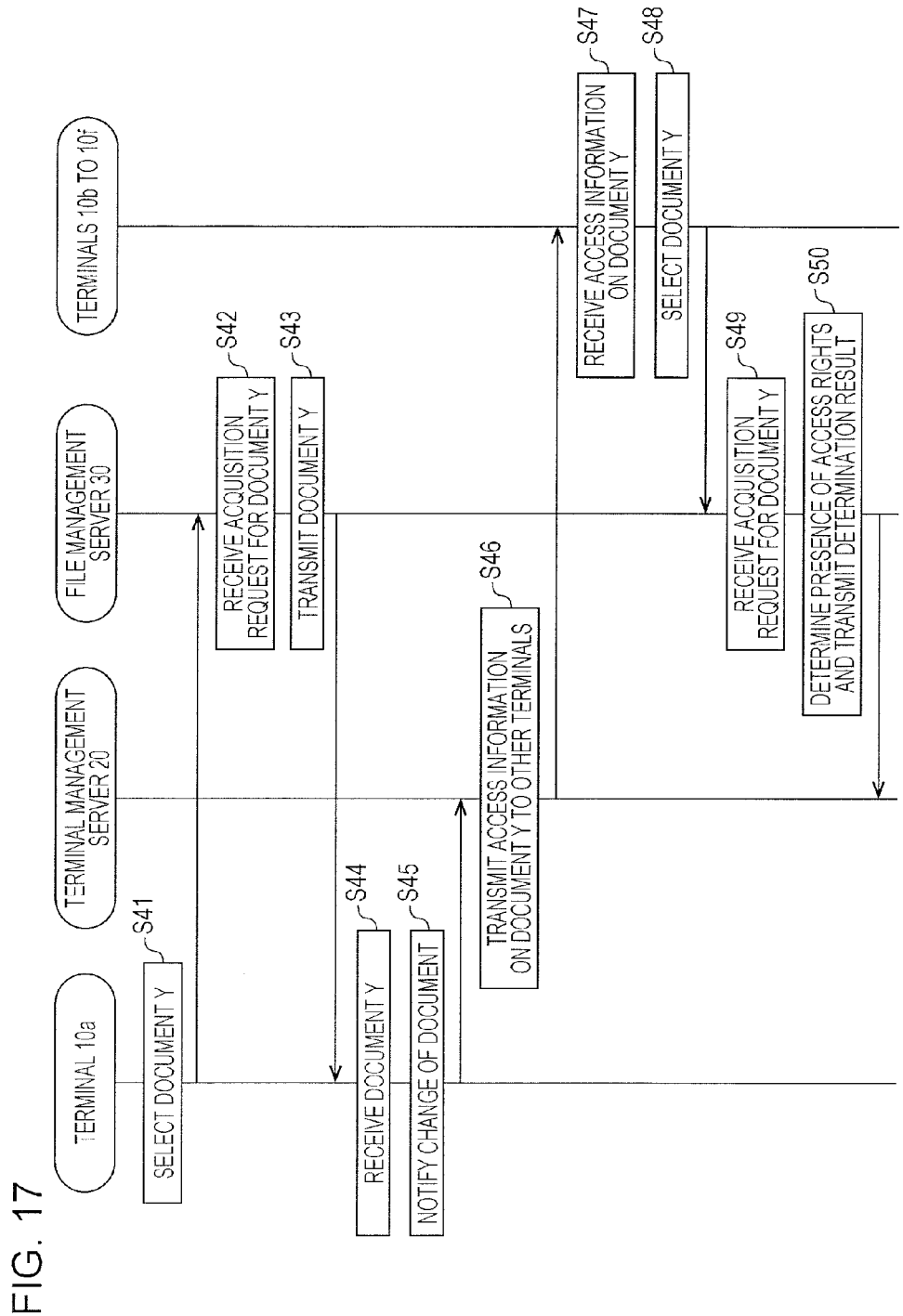
FIG. 17 is an operation flow diagram of an access control process performed in the teleconferencing system.
Figure 18:
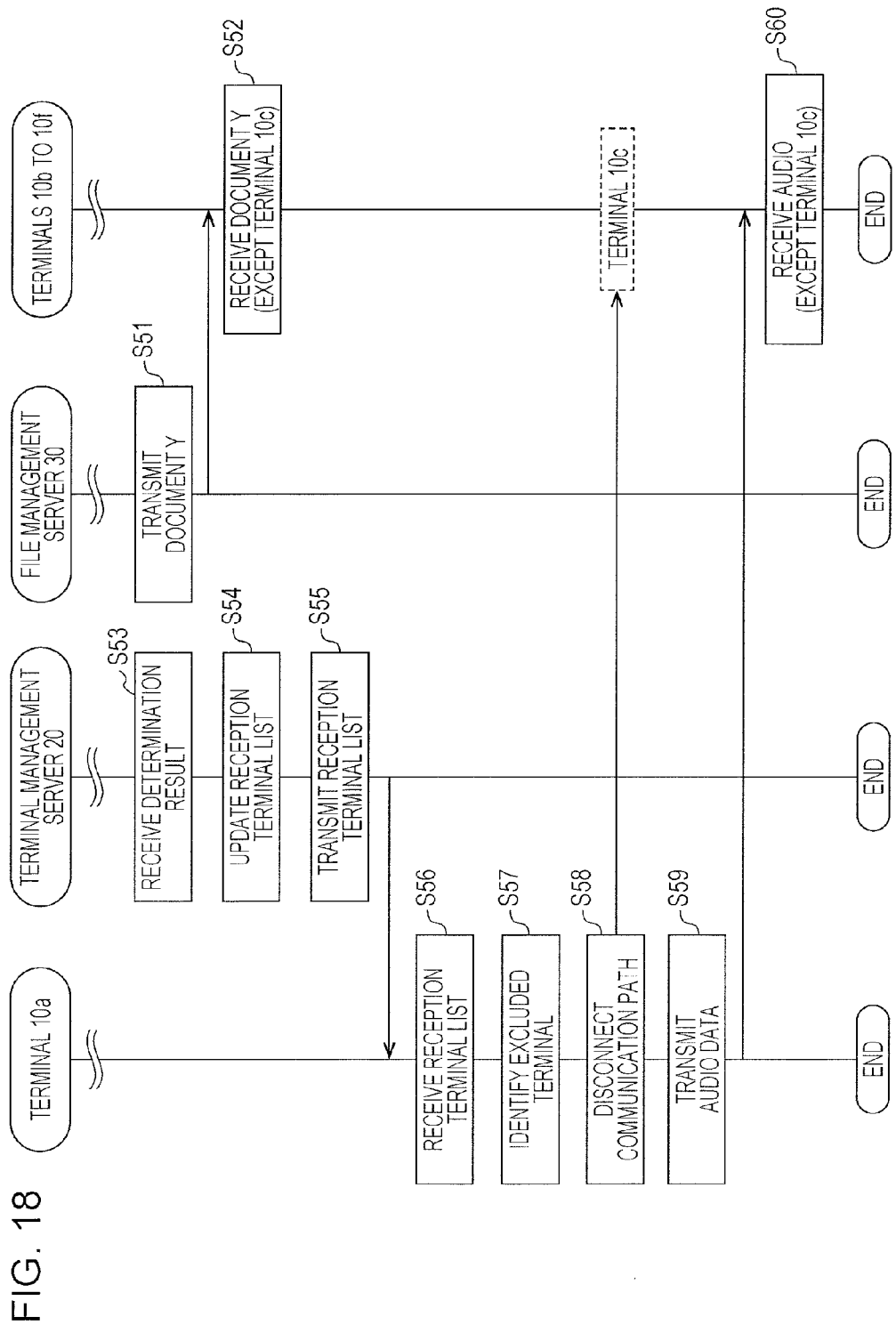
FIG. 18 is an operation flow diagram of the access control process performed in the teleconferencing system.

Next, the flow of the access control process performed in the teleconferencing system 100 will be described with reference to flow diagrams illustrated in FIG. 17 and FIG. 18. Now, a description will be given of an operation performed when the user A, who is a presenter, selects another document Y on the terminal 10a during the conference (while the document X is being synchronously displayed). It is assumed that audio communication paths are implemented by the creation of the network illustrated in FIG. 12 corresponding to the reception terminal list illustrated in FIG. 8. That is, it is assumed that the terminal 10a transmits the audio of the user A to the other terminals 10b, 10c, 10d, 10e, and 10f, and the users B, C, D, E, and F (i.e., the participants) of the other terminals 10b, 10c, 10d, 10e, and 10f are allowed to listen to the audio of the user A output from the audio output units 108 of their terminals while checking the document X on the display screen of their terminals.

First, in the situation described above (during the conference), the user A selects the document Y on the terminal 10a (S41). Then, the acceptance processing unit 31 of the file management server 30 receives an acquisition request for acquiring the document Y from the terminal 10a (S42). The acceptance processing unit 21 of the terminal management server 20 may receive the acquisition request from the terminal 10a, and the acceptance processing unit 21 may transfer the acquisition request to the file management server 30. When the file management server 30 receives the acquisition request, the file transmitting unit 33 transmits the document Y to the terminal 10a (S43).

Upon receipt of the document Y (S44), the terminal 10a transmits a notification (or a change notification) indicating a change of the document to the terminal management server 20 (S45). The change notification includes access information on the document Y (for example, the Uniform Resource Locator (URL) of the location where the document Y is stored). Upon receipt of the change notification, the acceptance processing unit 21 of the terminal management server 20 transmits the access information on the document Y to each of the terminals 10b, 10c, 10d, 10e, and 10f (S46).

Upon receipt of the access information on the document Y (S47), each of the terminals 10b, 10c, 10d, 10e, and 10f causes a message indicating that the document has been changed from the document X to the document Y and the access information (e.g., the URL of the location where the document Y is stored) to be displayed on the display unit 106 thereof. Each of the users B, C, D, E, and F of the terminals 10b, 10c, 10d, 10e, and 10f selects the document Y (i.e., the URL of the location where the document Y is stored) on their own terminal (S48). Then, the acceptance processing unit 31 of the file management server 30 receives an acquisition request for acquiring the document Y from each of the terminals 10b, 10c, 10d, 10e, and 10f (S49).

Then, the access determination processing unit 32 of the file management server 30 refers to the access restriction information DB 35 (see FIG. 16) in accordance with the acquisition request, and determines whether or not each user has a right to access the document Y (S50). For example, the users A, B, D, E, and F have a right to access the document Y, whereas the user C does not have a right to access the document Y. Accordingly, the access determination processing unit 32 determines that the users B, D, E, and F "have access rights" and the user C "has no access rights" in response to the acquisition requests for acquiring the document Y, which are received from the terminals 10b, 10c, 10d, 10e, and 10f. The access determination processing unit 32 transmits the determination results to the terminal management server 20 (S50).

Further, the file transmitting unit 33 transmits the document Y to the terminals 10b, 10d, 10e, and 10f respectively used by the users B, D, E, and F determined to "have access rights" (S51). Upon receipt of the document Y (S52), each of the terminals 10b, 10d, 10e, and 10f saves the received document Y to the storage unit 103 thereof. Thereafter, each of the terminals 10b, 10d, 10e, and 10f receives presenter operation information corresponding to the content of the operation performed by the user A on the terminal 10a from the terminal management server 20, and synchronously displays the document Y.

When the terminal management server 20 receives the determination results from the access determination processing unit 32 (S53), the terminal information generation unit 27 updates the reception terminal list (see FIG. 8) (S54). Specifically, the terminal information generation unit 27 excludes a terminal used by a user who has no access rights from the reception terminal list. In the illustrated example, the terminal information generation unit 27 excludes the terminal 10c, and obtains an updated reception terminal list illustrated in FIG. 19. The terminal information generation unit 27 transmits the updated reception terminal list to the terminal 10a that performs audio transmission (S55).

Figure 20:
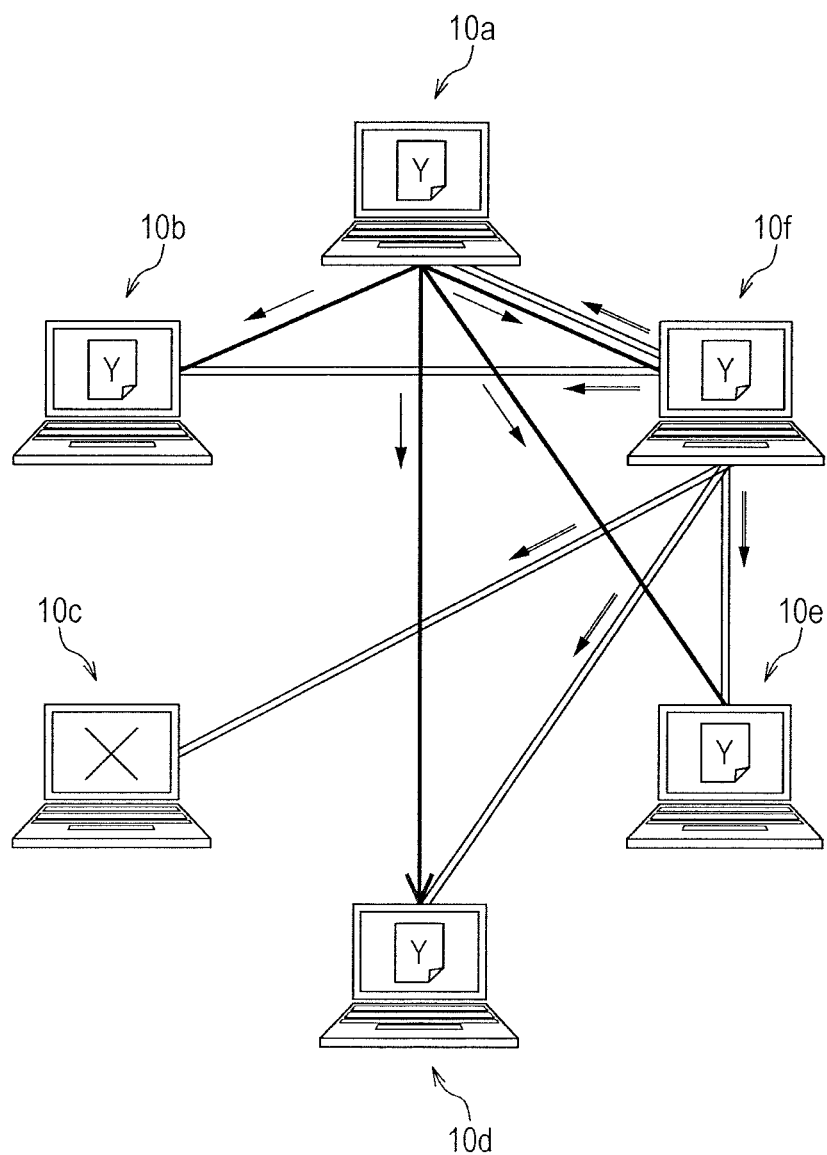
FIG. 20 illustrates an example network configuration of the teleconferencing system.

Then, when the terminal 10a receives the reception terminal list (see FIG. 19) (S56), the communication path controller 14 compares the original reception terminal list before the update (see FIG. 8) with the updated reception terminal list (see FIG. 19), and identifies a terminal (i.e., an excluded terminal) that is not included in the updated reception terminal list (S57). In the illustrated example, the communication path controller 14 identifies the terminal 10c. Then, the communication path controller 14 disconnects the communication path established between the terminal 10a and the identified terminal (S58). In the illustrated example, the communication path controller 14 disconnects the communication path between the terminal 10a and the terminal 10c. In the way described above, the terminal 10a re-establishes the communication paths. Accordingly, the network of the communication paths illustrated in FIG. 12 is updated (or re-created) into a network illustrated in FIG. 20. In FIG. 20, the cross mark "x" shown on the display unit 106 of the terminal 10c indicates that the document Y is not synchronously displayed.

Figure 21:
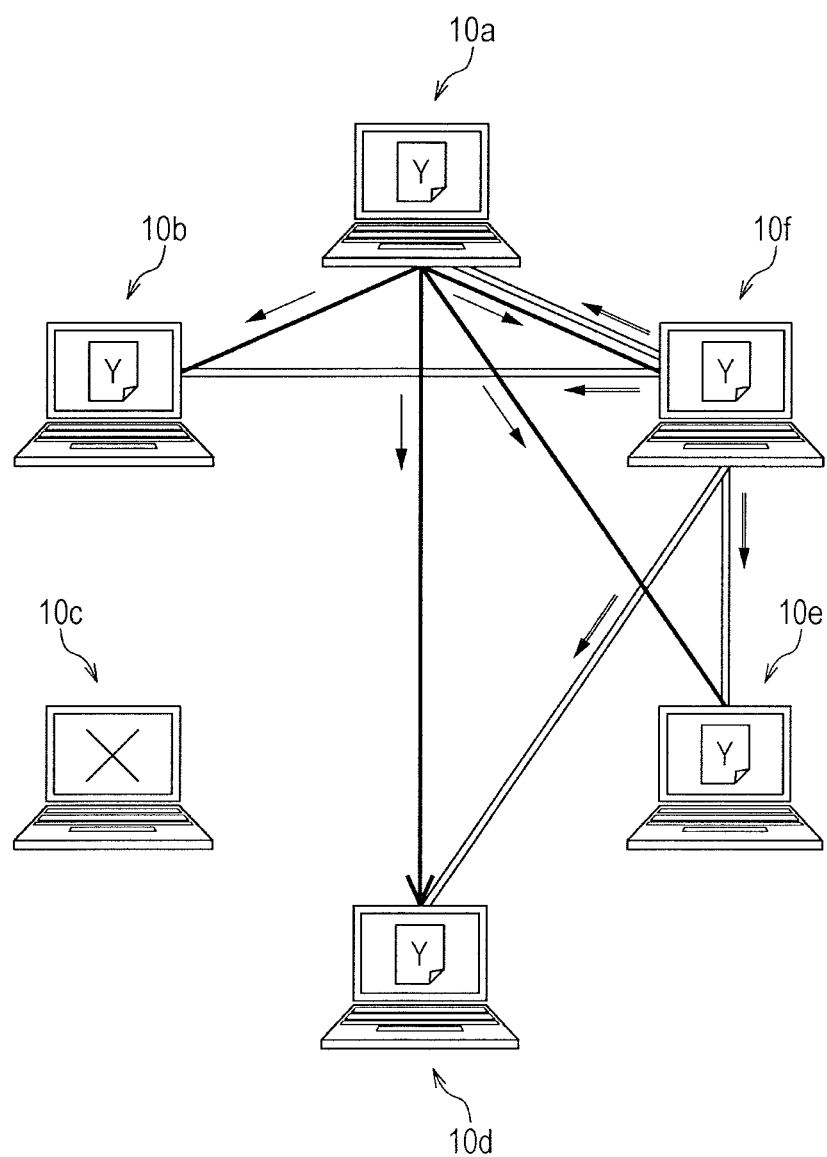
FIG. 21 illustrates an example network configuration of the teleconferencing system.

In the process described above, the re-establishment of a communication path for the terminal 10a is illustrated. Alternatively, the communication paths for all the terminals from which transmission of audio has been permitted may be re-established. In the illustrated example, the terminal 10f may re-establish the communication paths. Accordingly, the communication path between the terminal 10f and the terminal 10c is also disconnected. In this case, the network of the communication paths illustrated in FIG. 12 is updated (or re-created) into a network illustrated in FIG. 21.

Figure 22:
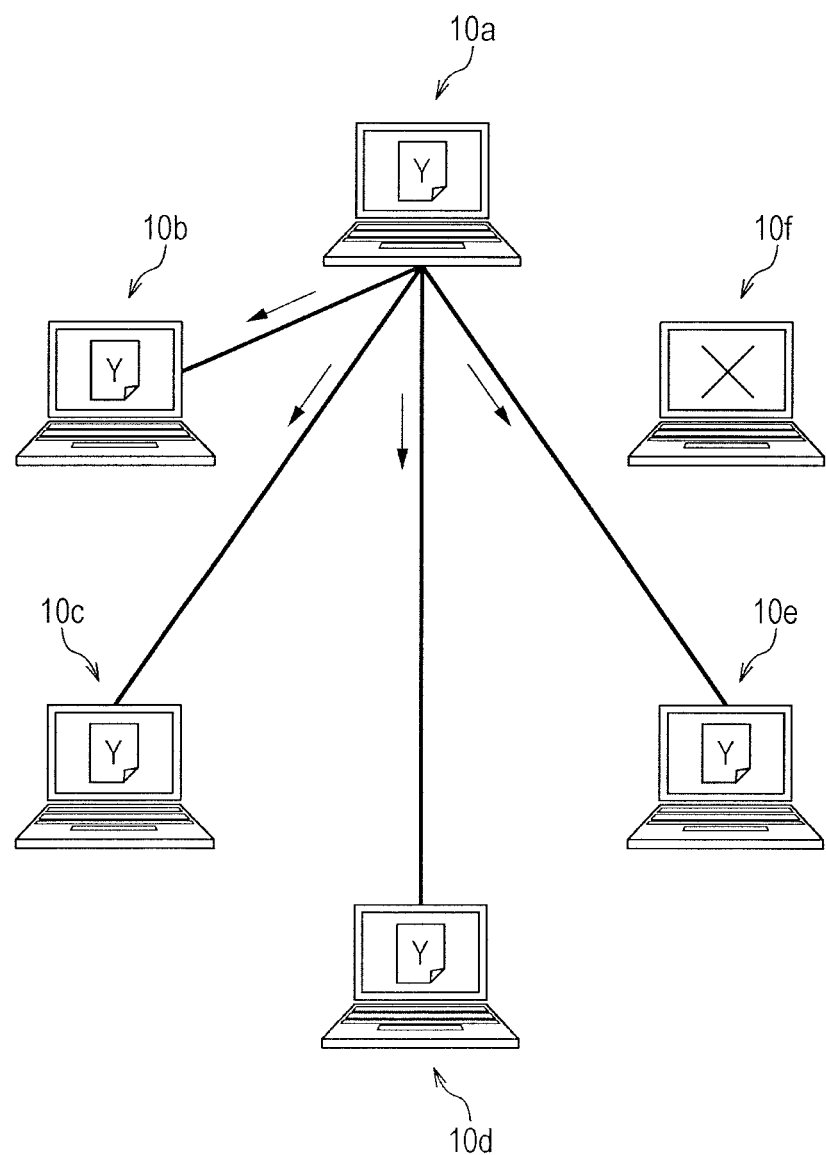
FIG. 22 illustrates an example network configuration of the teleconferencing system.

In another example, the user A, who is a presenter, selects another document Z on the terminal 10a during the conference (while the document X is being synchronously displayed). In this case, the user F is determined to "have no access rights" (see FIG. 16). Then, the communication path between the terminal 10a and the terminal 10f and the communication paths extending from the terminal 10f to the respective terminals are disconnected, and the communication paths for audio transmission are updated (or re-created) into a network illustrated in FIG. 22.

In the configuration described above (see FIG. 21), for example, the terminal 10c used by a user who does not have a right to access the document Y is prohibited from both transmitting the document Y and transmitting audio. However, the configuration of the teleconferencing system 100 is not limited to the configuration described above. In the example described above, for example, the teleconferencing system 100 may be configured to prohibit the terminal 10c from transmitting only audio while permitting the terminal 10c to transmit the document Y, or to prohibit the terminal 10c from transmitting only the document Y while permitting the terminal 10c to transmit audio.

First Modification

The access control process performed in the teleconferencing system 100 is not limited to that described above, and may have the following configuration.

First, during a conference (as in the situation described above), the user A selects the document Y on the terminal 10a. Then, the acceptance processing unit 21 of the terminal management server 20 receives an acquisition request for acquiring the document Y from the terminal 10a. Then, the terminal management server 20 acquires the document Y from the file management server 30 in accordance with whether or not the user A has a right to access the document Y. If the user A has a right to access the document Y, the terminal management server 20 acquires the document Y, and transmits the document Y to the terminal 10a used by the user A. Further, the terminal management server 20 transmits a notification (or a change notification) indicating a change of the document to each of the terminals 10b, 10c, 10d, 10e, and 10f.

Then, the terminal 10a disconnects all the communication paths for audio transmission, and re-transmits an audio transmission request to the terminal management server 20. Upon receipt of the change notification, each of the terminals 10b, 10c, 10d, 10e, and 10f transmits an acquisition request for acquiring the document Y in accordance with the operation of the corresponding user (e.g., selection of the document Y). Similarly to the terminal 10a, a terminal from which transmission of audio has been permitted among the terminals 10 of the participants disconnects all the communication paths for audio transmission, and re-transmits an audio transmission request to the terminal management server 20.

Then, the terminal management server 20 acquires the document Y from the file management server 30 in accordance with whether or not each of the users B, C, D, E, and F has a right to access the document Y. The terminal management server 20 attempts to acquire the document Y for each of the terminals 10b, 10c, 10d, 10e, and 10f respectively used by the users B, C, D, E, and F. The terminal management server 20 transmits the document Y to the terminal 10 that is being used by a user who has access rights and that has successfully acquired the document Y. Further, the terminal management server 20 does not transmit the document Y to the terminal 10 that is being used by a user who has no access rights and that has failed to acquire the document Y, and disconnects the communication path for audio transmission. In the illustrated example, the user C does not have a right to access the document Y. Thus, the terminal management server 20 disconnects the communication path with the terminal 10c used by the user C (see FIG. 21).

Second Modification

The access control process performed in the teleconferencing system 100 may have the following configuration.

First, during a conference (as in the situation described above), the user A selects the document Y on the terminal 10a. Then, the acceptance processing unit 21 of the terminal management server 20 receives an acquisition request for acquiring the document Y from the terminal 10a. Then, the terminal management server 20 acquires the document Y from the file management server 30 in accordance with whether or not the user A has a right to access the document Y. If the user A has a right to access the document Y, the terminal management server 20 acquires the document Y, and transmits the document Y to the terminal 10a of the user A. Further, the terminal management server 20 transmits a notification (or a change notification) indicating a change of the document and a notification (or a disconnection request) indicating a disconnection of a communication path for audio transmission to each of the terminals 10b, 10c, 10d, 10e, and 10f.

Then, upon receipt of the disconnection request, each of the terminals 10b, 10c, 10d, 10e, and 10f disconnects its communication path. Further, upon receipt of the change notification, each of the terminals 10b, 10c, 10d, 10e, and 10f transmits an acquisition request for acquiring the document Y in accordance with the operation of the corresponding user (e.g., selection of the document Y).

Then, the terminal management server 20 acquires the document Y from the file management server 30 in accordance with whether or not each of the users B, C, D, E, and F has a right to access the document Y. The terminal management server 20 attempts to acquire the document Y for each of the terminals 10b, 10c, 10d, 10e, and 10f respectively used by the users B, C, D, E, and F. The terminal management server 20 transmits the document Y to the terminal 10 that is being used by a user who has access rights and that has successfully acquired the document Y. Upon receipt of the document Y, the terminal 10 accepts either of "audio transmission" and "audio reception" that the user wishes to perform. After either of them is accepted, the communication path establishment process described above (see FIG. 13 to FIG. 15) is executed.

Further, the terminal management server 20 does not transmit the document Y to the terminal 10 that is being used by a user who has no access rights and that has failed to acquire the document Y, and does not re-establish the communication path.

Third Modification

The access control process performed in the teleconferencing system 100 may have the following configuration. In the flow diagram illustrated in FIG. 18, when the terminal information generation unit 27 updates the reception terminal list (see FIG. 8) (S54), the terminal management server 20 may disconnect the communication path between the terminal 10a and a terminal excluded from the reception terminal list (i.e., a terminal used by a user who has no access rights). Thus, the terminal management server 20 may have functions as a communication path controller, and may execute a process for establishing and disconnecting a communication path between terminals.

Fourth Modification

The access control process performed in the teleconferencing system 100 may have the following configuration. In the flow diagram illustrated in FIG. 17, after each of the terminals 10 has received access information on the document Y (S47), the user selects the document Y (the URL of the location where the document Y is stored) on their own terminal 10 (S48), and attempts to acquire the document Y. In this case, if the user has not successfully acquired the document Y because of having no access rights, the terminal 10 notifies the terminal management server 20 that the terminal 10 has failed to acquire the document Y (or an acquisition failure notification). When the terminal management server 20 receives the acquisition failure notification, the terminal information generation unit 27 updates the reception terminal list. For example, the terminal information generation unit 27 excludes the terminal 10c, which has transmitted an acquisition failure notification, from the reception terminal list.

Fifth Modification

Figure 23:
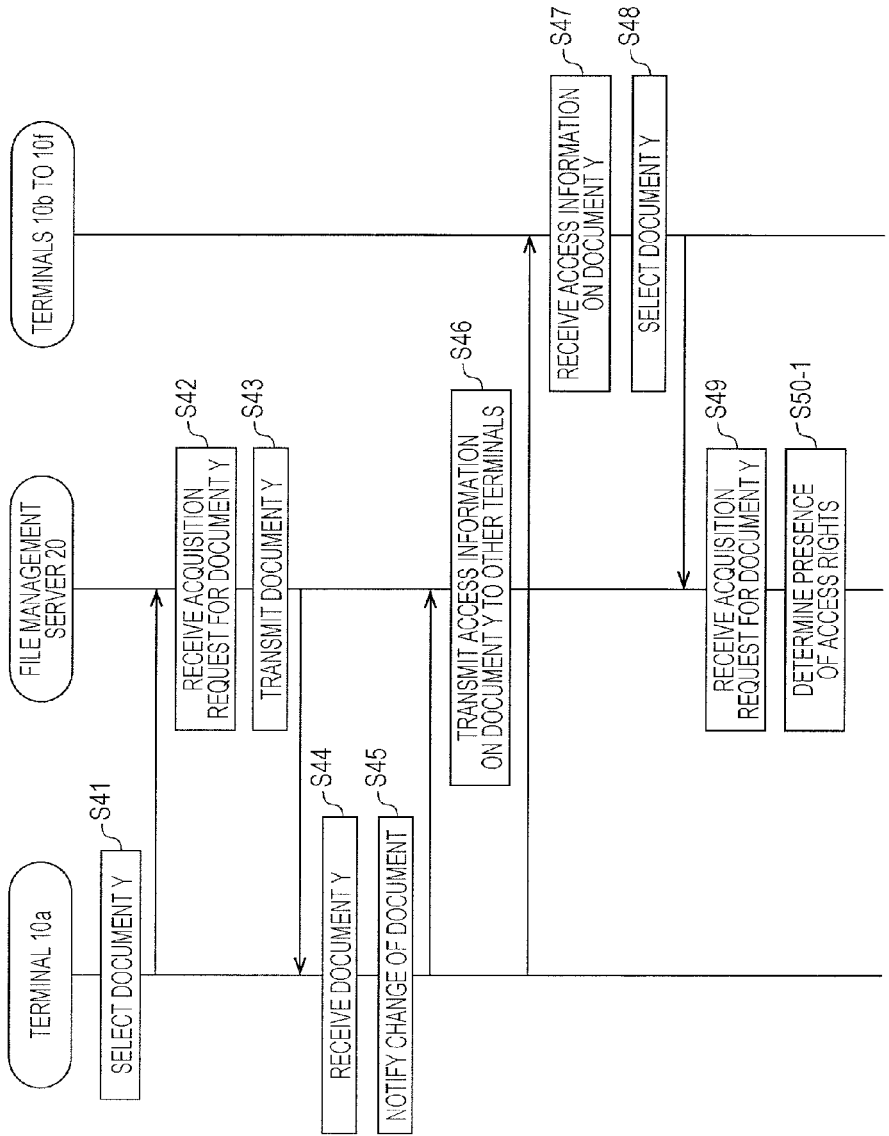
FIG. 23 is an operation flow diagram of an access control process performed in a teleconferencing system according to a fifth modification.
Figure 24:
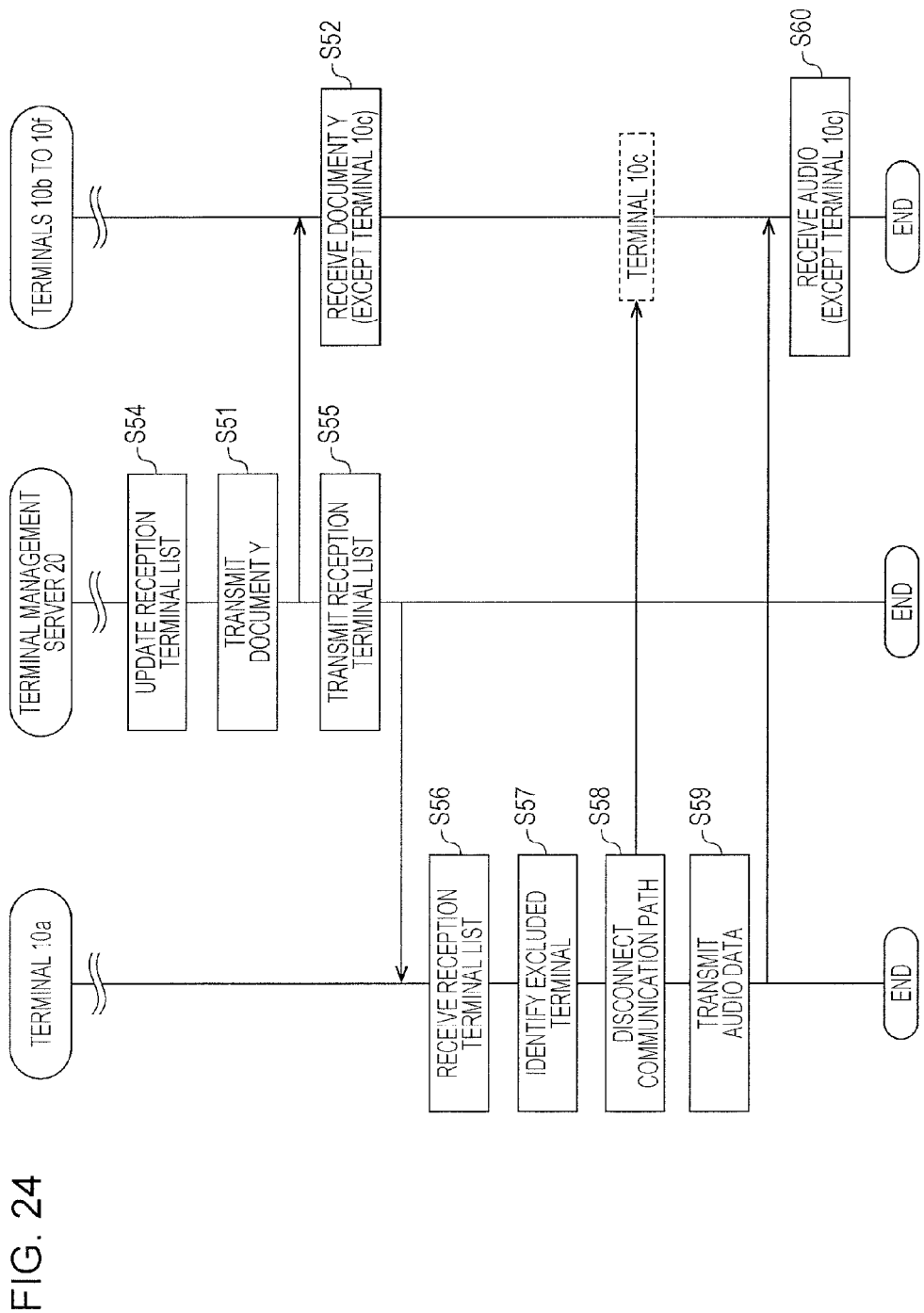
FIG. 24 is an operation flow diagram of the access control process performed in the teleconferencing system according to the fifth modification.

As described above, the terminal management server 20 and the file management server 30 may be included in a single information processing apparatus. For example, the terminal management server 20 may include the file management server 30. FIG. 23 and FIG. 24 are flow diagrams illustrating an access control process performed in a teleconferencing system 100 according to a fifth modification. In FIG. 23 and FIG. 24, substantially the same operations as the operations in the flow diagrams illustrated in FIG. 17 and FIG. 18 are assigned the same step numbers.

In the teleconferencing system 100 according to the fifth modification, in the terminal management server 20, when the acceptance processing unit 31 receives an acquisition request for acquiring the document Y from each of the terminals 10b, 10c, 10d, 10e, and 10f (S49), the access determination processing unit 32 determines whether each user has a right to access the document Y in accordance with the acquisition request (S50-1). Then, the terminal information generation unit 27 updates the reception terminal list (see FIG. 8) (S54), and the file transmitting unit 33 transmits the document Y to the terminals 10 registered in the updated reception terminal list (S51). In the illustrated example, the file transmitting unit 33 transmits the document Y to the terminals 10b, 10d, 10e, and 10f, except the terminal 10c. In the subsequent synchronous display process, the notification unit 23 of the terminal management server 20 notifies only the terminals registered in the reception terminal list of presenter operation information.

Sixth Modification

A configuration for transmission and reception of audio in the teleconferencing system 100 is not limited to the configuration described above, and any of various configurations may be used. In the following, a teleconferencing system 100 according to a sixth modification will be described, focusing on differences from the configuration described above. In the teleconferencing system 100 according to the sixth modification, components having substantially the same functions as those of the teleconferencing system 100 described above are not described.

Figure 25:
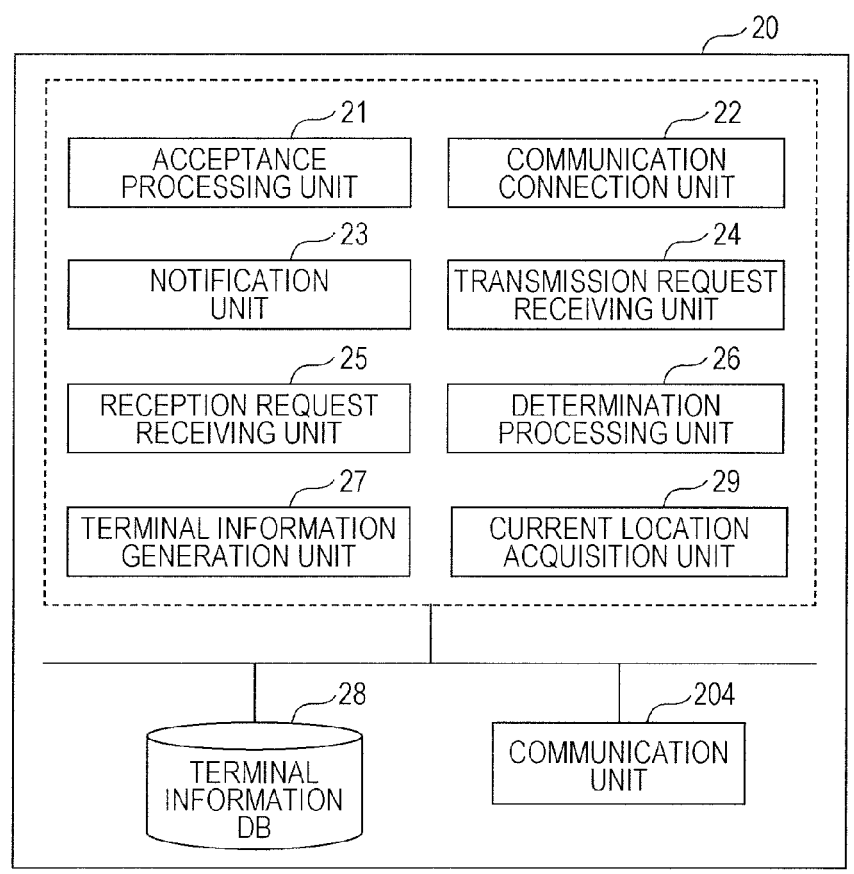
FIG. 25 is a functional block diagram illustrating a specific configuration of a terminal management server according to a sixth modification.

In the teleconferencing system 100 according to the sixth modification, the terminal management server 20 may further include a current location acquisition unit 29 that acquires the current location of each of the terminals 10. FIG. 25 is a functional block diagram illustrating a specific configuration of the terminal management server 20 according to the sixth modification.

The current location acquisition unit 29 receives a detection value of a position detector (not illustrated) (such as a global positioning system (GPS) detector) included in, for example, each of the terminals 10, and acquires the current location (such as the address) of the corresponding one of the terminals 10. Alternatively, location information such as subnets in a network or IP addresses may be set in advance, and the current location acquisition unit 29 may acquire the IP addresses of the terminals 10 to acquire the current locations of the terminals 10.

The determination processing unit 26 determines, in accordance with a reception request received by the reception request receiving unit 25 and the current locations of the terminals 10 acquired by the current location acquisition unit 29, whether or not reception of audio by the terminal 10 that has transmitted the reception request is permitted.

The terminal information generation unit 27 generates reception terminal information in accordance with the reception request received by the reception request receiving unit 25 and the determination result of the determination processing unit 26. Specifically, the terminal information generation unit 27 lists pieces of information on the terminals 10 permitted by the determination processing unit 26 among the terminals 10 that have made a reception request to generate a reception terminal list. The terminal information generation unit 27 transmits the reception terminal list to the terminals 10 from which transmission of audio has been permitted by the determination processing unit 26. As described above, the terminal information generation unit 27 updates the reception terminal list in accordance with the determination result of the access determination processing unit 32 (see FIG. 3) that has determined the authorization to access (or the presence or absence of the right to access) the document.

Figure 26:
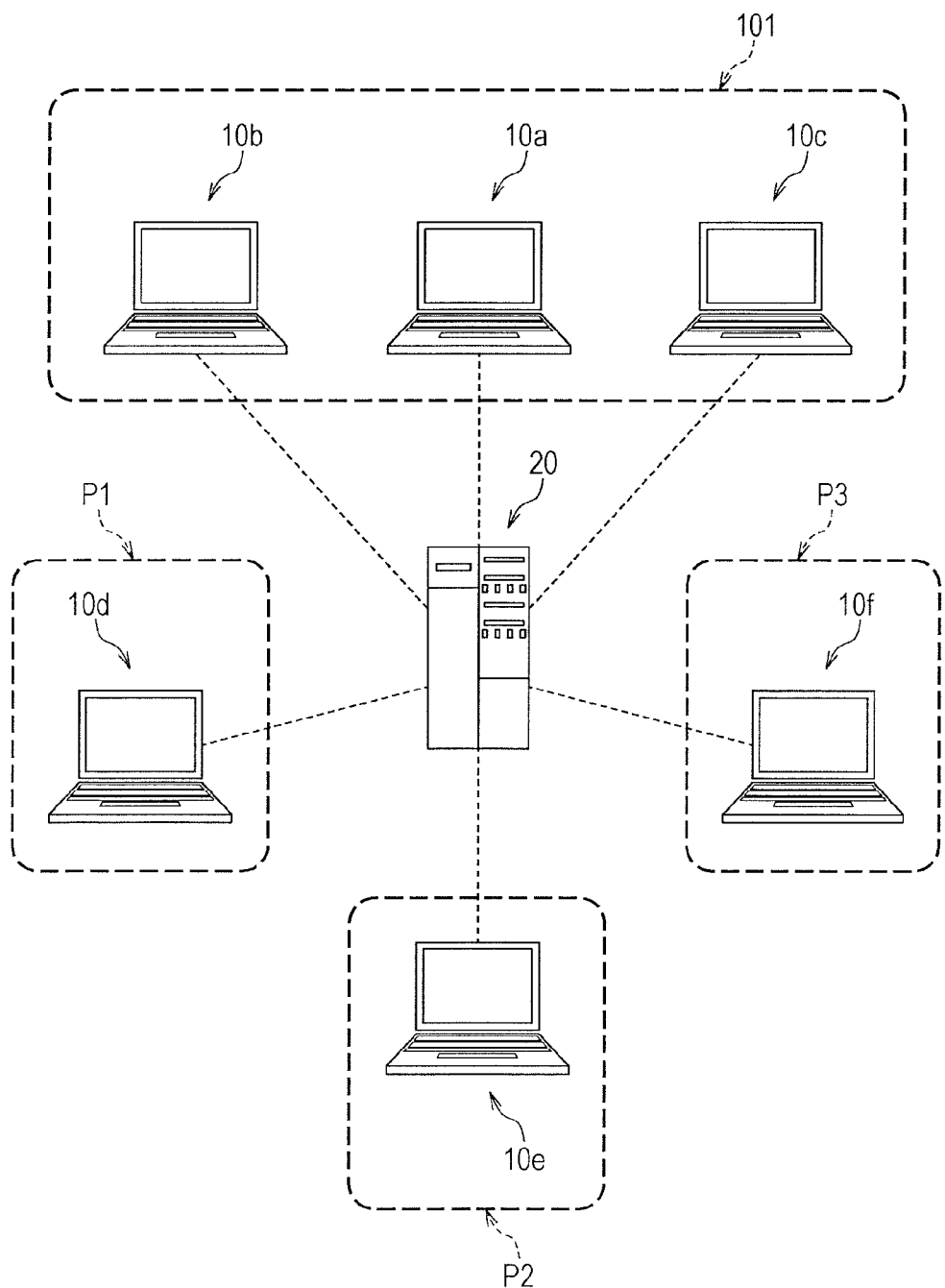
FIG. 26 illustrates an example network configuration of a teleconferencing system according to the sixth modification.

A specific example will be described hereinafter. FIG. 26 illustrates a network configuration in which the terminals 10a, 10b, and 10c are located in a conference room 101, the terminal 10d is located in a remote place P1 far away from the conference room 101, the terminal 10e is located in a remote place P2 far away from the conference room 101, and the terminal 10f is located in a remote place P3 far away from the conference room 101.

In the network configuration illustrated in FIG. 26, it is assumed that the terminals 10a and 10f have transmitted a transmission request, and the terminals 10a to 10f have transmitted a reception request. Since the total number (i.e., two) of terminals that have made a transmission request is less than or equal to a set value (i.e., "3"), transmission of audio from the terminals 10a and 10f is permitted.

The current location acquisition unit 29 acquires current locations from the terminals 10a to 10f. That is, the current location acquisition unit 29 acquires "the conference room 101" as the current locations of the terminals 10a, 10b, and 10c, the "remote place P1" as the current location of the terminal 10d, the "remote place P2" as the current location of the terminal 10e, and the "remote place P3" as the current location of the terminal 10f.

The determination processing unit 26 determines whether or not the current locations of the terminals 10 are the same or are in a preset range (or in a predetermined location). If the multiple terminals 10 are located in the predetermined location, the determination processing unit 26 permits reception of audio by one of the multiple terminals 10, and rejects reception of audio by the other terminals 10. In the network configuration illustrated in FIG. 26, among the terminals 10a, 10b, and 10c located in the predetermined location (e.g., the conference room 101), reception of audio by the terminal 10a is permitted, and reception of audio by the terminals 10b and 10c is rejected. The determination processing unit 26 transmits the determination result (a permission notification or a rejection notification) to the terminal that has transmitted the reception request.

Figure 28:
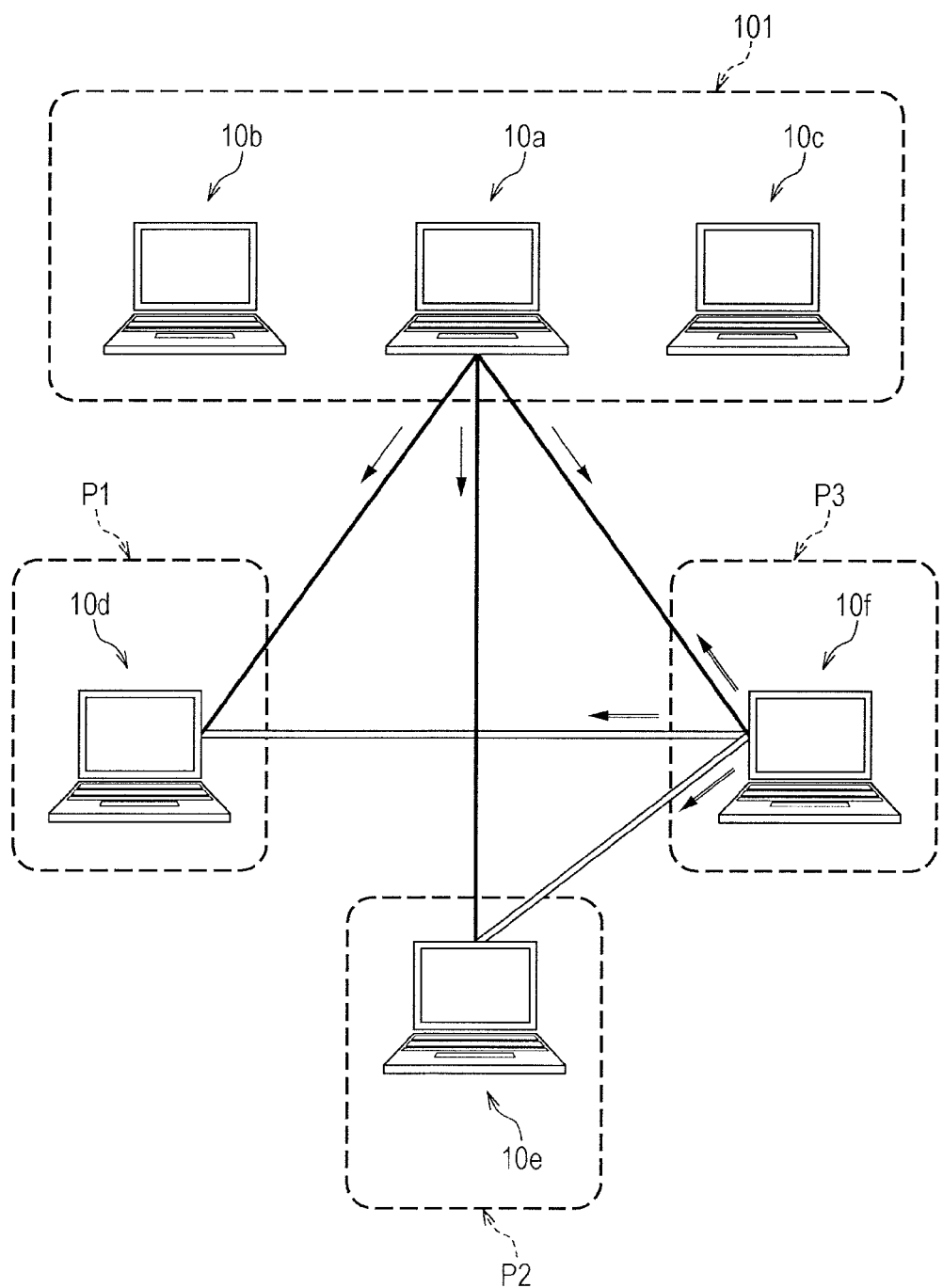
FIG. 28 illustrates an example network configuration indicating communication paths according to the sixth modification.

The terminal information generation unit 27 generates a reception terminal list illustrated in FIG. 27 in accordance with the determination results, and transmits the reception terminal list to the terminals 10a and 10f. The terminals 10a and 10f establish communication paths in accordance with the obtained reception terminal list. FIG. 28 illustrates a network configuration indicating communication paths established in the teleconferencing system 100 according to the sixth modification.

If multiple terminals 10 are located in the predetermined location and some of the multiple terminals 10 have made a transmission request, the determination processing unit 26 may permit transmission of audio from one of the terminals 10 that have made a transmission request, and reject transmission of audio from the other terminals 10. For example, the terminals 10a, 10b, and 10c located in the conference room 101 have made a transmission request. In this case, transmission of audio from the terminal 10a is permitted, and transmission of audio from the terminals 10b and 10c is rejected. The terminal information generation unit 27 transmits a reception terminal list to the terminal 10a from which transmission of audio has been permitted, and the terminal 10a establishes a communication path in accordance with the obtained reception terminal list.

In a conference with the network configuration described above, multiple users (for example, the users B and C) using multiple terminals 10 located in the same conference room are able to directly listen to the speech of one user (for example, the user A), and are also able to listen to the speech of any other user (for example, the user D, E, or F) at a remote place by outputting the speech from any one (for example, the terminal 10a) of the multiple terminals 10 that has received the speech.

Seventh Modification

In a teleconferencing system 100 according to a seventh modification, the set value described above may be dynamically changed. Specifically, the set value may be set in accordance with the number of terminals 10 connected via the communication network 50. For example, the set value may be reduced in accordance with an increase in the number of terminals 10. This configuration may be suitable for use in teleconferences in which speakers (or presenters) are fixed, such as in a seminar. The set value may also be calculated and set in accordance with the ratio of the set value to the total number of terminals 10 connected via a network. Alternatively, the set value may be set in accordance with the number of terminals 10 that have made a reception request.

Eighth Modification

In a teleconferencing system 100 according to an eighth modification, when the period of time during which no audio data has been transmitted from a terminal 10 from which transmission of audio was permitted after a communication path was established has reached a preset value, the communication path controller 14 (see FIG. 5) may cancel the communication path corresponding to the terminal 10. For example, if a user A from whom transmission of audio has been permitted is silent for a certain period of time, the communication path controller 14 may forcibly cancel the communication path established for the terminal 10a of the user A. In the configuration described above, furthermore, an image of a user who uses a transmission terminal may be captured using a camera, and the captured image may be analyzed to determine whether or not the user has spoken and to measure the length of time during which the user has remained silent. The camera may be mounted in the terminal 10, or may be placed outside the terminal 10 (for example, may be placed in a conference room).

Ninth Modification

In the exemplary embodiment described above, as illustrated in FIG. 15, if a transmission rejection notification is acquired, the display controller 16 of the terminal 10 causes an error message to be displayed on the display unit 106. However, a configuration for rejection of audio transmission is not limited to that described above.

In a teleconferencing system 100 according to a ninth modification, for example, control may be performed to prevent the checkbox from being checked if the total number of transmission terminals has reached a set value at the time when a terminal 10 is connected to the terminal management server 20. Further, the checkbox may be controlled by acquiring information from the terminal management server 20 in accordance with a change in the total number of transmission terminals. The total number of transmission terminals may be acquired from the terminal management server 20 through polling. Preferably, each terminal may remain connected by using Web Socket or the like, and the terminal management server 20 may contact each terminal.

Tenth Modification

The teleconferencing system 100 according to this exemplary embodiment may not necessarily involve the communication path establishment process described above. In a tenth modification, the terminal management server 20 in the teleconferencing system 100 has a function of causing the multiple terminals 10 connected via the communication network 50 to synchronously display part of a display screen. Specifically, the terminal management server 20 includes a user identification unit (e.g., the acceptance processing unit 21) that identifies users who use the terminals 10 connected to the communication network 50, an acceptance processing unit 21 (an acceptance unit) that accepts document information on a document selected by a first user (or a presenter) on a first terminal 10 and operation information (or presenter operation information) on an operation performed on the document, an access determination processing unit 32 (a determination unit) that determines whether or not each of the identified users has a right to access the document indicated by the accepted document information, and a notification unit 23 (a notification unit) that notifies a terminal 10 used by a user who is determined to have a right to access the document of the accepted document information and the accepted presenter operation information. The teleconferencing system 100 according to the tenth modification may involve an existing audio communication process.

In the configuration of the teleconferencing system 100 according to the tenth modification, for example, when the user A of the terminal 10a among the terminals that have already attended the conference (or on which synchronous display is enabled) changes the document to be synchronized to a new document, the new document is displayed on a terminal of a user who has a right to access the new document, whereas the new document is not displayed on a terminal of a user who does not have a right to access the new document.

Each of the teleconferencing systems 100 according to the exemplary embodiment and modifications described above may have the following configuration.

In the teleconferencing system 100, even if a large number of terminals are connected, the number of persons (i.e., speaker terminals) who speak simultaneously at a certain moment will be limited. Thus, the teleconferencing system 100 is configured to dynamically change the state of establishment of communication paths by switching between the transmission terminals while limiting the number of persons who are allowed to speak simultaneously (i.e., the number of transmission terminals).

The teleconferencing system 100 is further configured to allow each terminal to select audio transmission/audio reception, such that the terminal management server 20 is notified of a transition of the state of audio transmission/audio reception of each terminal.

Furthermore, the terminal management server 20 notifies a terminal for which audio transmission has been selected of a list of terminals for which audio reception has been selected. In this case, the terminal may not necessarily be notified of information on a terminal whose state has not been changed. Upon receipt of the notification, the transmission terminal makes a call (or initiates a connection request) to cause only a newly registered reception terminal to receive stream information transmitted from the transmission terminal.

The teleconferencing system 100 is also configured such that the terminal management server 20 manages the total number of terminals permitted to perform transmission simultaneously, and, when the total number has reached an upper limit value (or a set value), the selection of a transmission request by a terminal is disabled.

The teleconferencing system 100 may also be configured such that two types of transmission terminals are included, namely, a constant transmission terminal and a temporary transmission terminal, and the temporary transmission terminal is allowed to perform transmission only for a certain period of time, whereas, after the certain period of time has elapsed, audio transmission is canceled (or the checkmark is removed from the checkbox for transmission requests). Further, the temporary transmission terminal may be allowed to perform transmission only for a period during which a user presses an audio transmission button. Further, the temporary transmission terminal may be configured to cancel a transmission request if silence continues for a certain period of time.

The teleconferencing system 100 may also be configured to allow a user who wishes to speak to make a transmission request by using a terminal and configured to give the right to speak to a user who is designated by a specific terminal (or a master terminal) (or to give permission to a terminal used by the user as a transmission terminal).

The teleconferencing systems according to the exemplary embodiment and modifications described above are merely examples, and may be used in combination.

Figure 29:
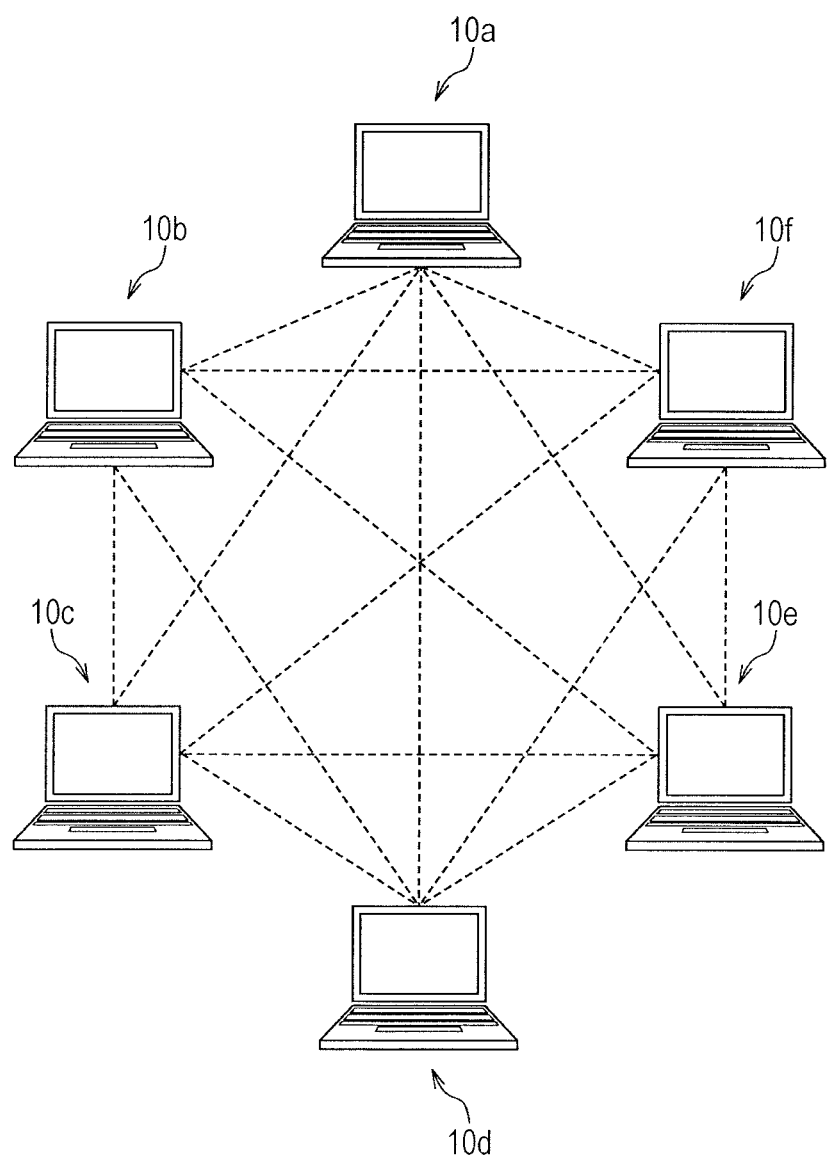
FIG. 29 illustrates an example network configuration of a teleconferencing system according to another exemplary embodiment.

Each of the network configurations of the teleconferencing systems may be a configuration (FIG. 29) which does not include the terminal management server 20. The configuration illustrated in FIG. 29 is implemented by downloading programs respectively corresponding to the components included in the teleconferencing system into the terminals 10a to 10f. Specifically, each of the teleconferencing systems is implemented by the CPU 101 of each of the terminals 10a to 10f executing a program stored in the memory 102 of the terminal. The program to be downloaded may be in, for example, JavaScript (registered trademark) form. In addition, each of the terminals 10 serves as an information processing apparatus when the program described above is downloaded or recorded to the terminal 10. Further, a computer from which the program described above is downloaded may be the terminal 10 or the terminal management server 20.

The teleconferencing system 100 is not limited to a system for transmission and reception of audio data. That is, the teleconferencing system 100 may be applied to transmission and reception of media data including at least one of audio data and video data (or moving image data). Further, each teleconferencing system may be used in various teleconferences including video conferences and telephone conferences. In video conferences, video captured using a camera mounted in each terminal is provided via two-way communication between terminals via the communication paths described above. Each of the teleconferencing systems may also be applied to a remote conference in which conference attendees are in distant locations.

While a teleconferencing system has been discussed as an example of an information processing system, the information processing system is not limited to a teleconferencing system, and may include diverse systems that allow network-connected terminals to share media data.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for synchronous display of a document for use at a conference on a plurality of terminals connected via a network and for transmission and reception of media data including at least one of audio data and video data, the process comprising:
   in accordance with whether or not each of a plurality of users has a right to access a document selected by a first user on a first terminal,
   controlling content for display on a plurality of terminals used by the plurality of users, and controlling transmission and reception of the media data between the first terminal and each of the plurality of terminals, wherein in a case where a second user does not have a right to access the document selected by the first user, the document is not displayed on a display screen of a terminal used by the second user, and transmission and reception of the media data between the first terminal and the second terminal are prohibited.

2. The non-transitory computer readable medium according to claim 1, wherein in a case where a third user has a right to access the document selected by the first user, the document is displayed on a display screen of a third terminal used by the third user so that display of the document on the display screen of the third terminal is synchronous with display of the document on a display screen of the first terminal, and the media data is transmitted and received between the first terminal and the third terminal.

3. The non-transitory computer readable medium according to claim 1, wherein the process further comprises referring to a memory that stores a plurality of documents for use at the conference in advance in association with information indicating whether or not each of the plurality of users has a right to access each of the plurality of documents, and determining, based on information associated with the document selected by the first user, whether or not each of the plurality of users has a right to access the document selected by the first user, and wherein, in accordance with a result of determination of whether or not each of the plurality of users has a right to access the document selected by the first user, the content for display on the plurality of terminals used by the plurality of users is controlled, and transmission and reception of the media data between the first terminal and each of the plurality of terminals are controlled.

4. A non-transitory computer readable medium storing a program causing a computer to execute a process for synchronous display of a document for use at a conference on a plurality of terminals connected via a network and for transmission and reception of media data including at least one of audio data and video data, the process comprising:

in accordance with whether or not each of a plurality of users has a right to access a document selected by a first user on a first terminal, controlling content for display on a plurality of terminals used by the plurality of users, and controlling transmission and reception of the media data between the first terminal and each of the plurality of terminals, wherein in response to the first user selecting and displaying a second document different from a first document on the first terminal while the first document is synchronously displayed on the plurality of terminals and the media data is transmitted and received via a communication path established for the plurality of terminals, a communication path established between the first terminal and a terminal used by a user who does not have a right to access the second document is disconnected.

5. The non-transitory computer readable medium according to claim 4, wherein the second document is synchronously displayed on a display screen of a terminal used by a user who has a right to access the second document, and the second document is not displayed on a display screen of a terminal used by a user who does not have a right to access the second document.

6. A non-transitory computer readable medium storing a program causing a computer to execute a process for synchronous display of a document for use at a conference on a plurality of terminals connected via a network and for transmission and reception of media data including at least one of audio data and video data, the process comprising:

in accordance with whether or not each of a plurality of users has a right to access a document selected b a first user on a first terminal, controlling content for display on a plurality of terminals used by the plurality of user, and controlling transmission and reception of the media data between the first terminal and each of the plurality of terminals, wherein the process further comprises:

receiving a transmission request for the media data from at least one terminal;

receiving a reception request for the media data from at least one terminal; and establishing a communication path to transmit the media data between a terminal that has made the transmission request and one or more terminals that have made the reception request in a case where the total number of terminals that have made the transmission request is less than or equal to a predetermined set value.

7. The non-transitory computer readable medium according to claim 6, wherein in a case where the communication path has been established between each of a plurality of terminals that have transmitted the transmission request and each of a plurality of terminals that have transmitted the reception request, and in a case where a user who uses a second terminal that has transmitted the reception request does not have a right to access the document selected by the first user, the communication path established between each of the plurality of terminals that have transmitted the transmission request and the second terminal is disconnected.

8. The non-transitory computer readable medium according to claim 6, wherein the process further comprises acquiring a current location of each of the plurality of terminals, and wherein, in a case where a plurality of terminals that have transmitted the reception request are located within a predetermined range, the communication path is established between a terminal that has made the transmission request and one of the plurality of terminals located within the predetermined range.

9. The non-transitory computer readable medium according to claim 6, wherein in a case where a new transmission request is received from a terminal while the total number of terminals that have made the transmission request has reached the set value, establishment of the communication path for the terminal that has made the new transmission request is rejected.

10. The non-transitory computer readable medium according to claim 6, wherein in a case where a period of time during which the media data is not transmitted from a terminal that has made the transmission request after the communication path was established has reached a predetermined value, the communication path corresponding to the terminal that has made the transmission request is canceled.

11. An information processing apparatus for synchronous display of a document for use at a conference on a plurality of terminals connected via a network and for transmission and reception of media data including at least one of audio data and video data, the information processing apparatus comprising:
  a controller that, in accordance with whether or not each of a plurality of users has a right to access a document selected by a first user on a first terminal, controls content for display on a plurality of terminals used by the plurality of users, and controls transmission and reception of the media data between the first terminal and each of the plurality of terminals, wherein
  in a case where a second user does not have a right to access the document selected by the first user,
  the document is not displayed on a display screen of a second terminal used by the second user, and
  transmission and reception of the media data between the first terminal and the second terminal are prohibited.

12. An information processing system for synchronous display of a document for use at a conference on a plurality of terminals connected via a network and for transmission and reception of media data including at least one of audio data and video data, the information processing system comprising:
  a controller that, in accordance with whether or not each of a plurality of users has a right to access a document selected by a first user on a first terminal, controls content for display on a plurality of terminals used by the plurality of users, and controls transmission and reception of the media data between the first terminal and each of the plurality of terminals, wherein
  in a case where a second user does not have a right to access the document selected by the first user,
  the document is not displayed on a display screen of a second terminal used by the second user, and
  transmission and reception of the media data between the first terminal and the second terminal are prohibited.

* * * * *